Feb. 4, 1958
G. D. ARNOLD
2,822,153
AGRICULTURAL DEHYDRATING SYSTEM
Filed Jan. 2, 1953
15 Sheets-Sheet 1
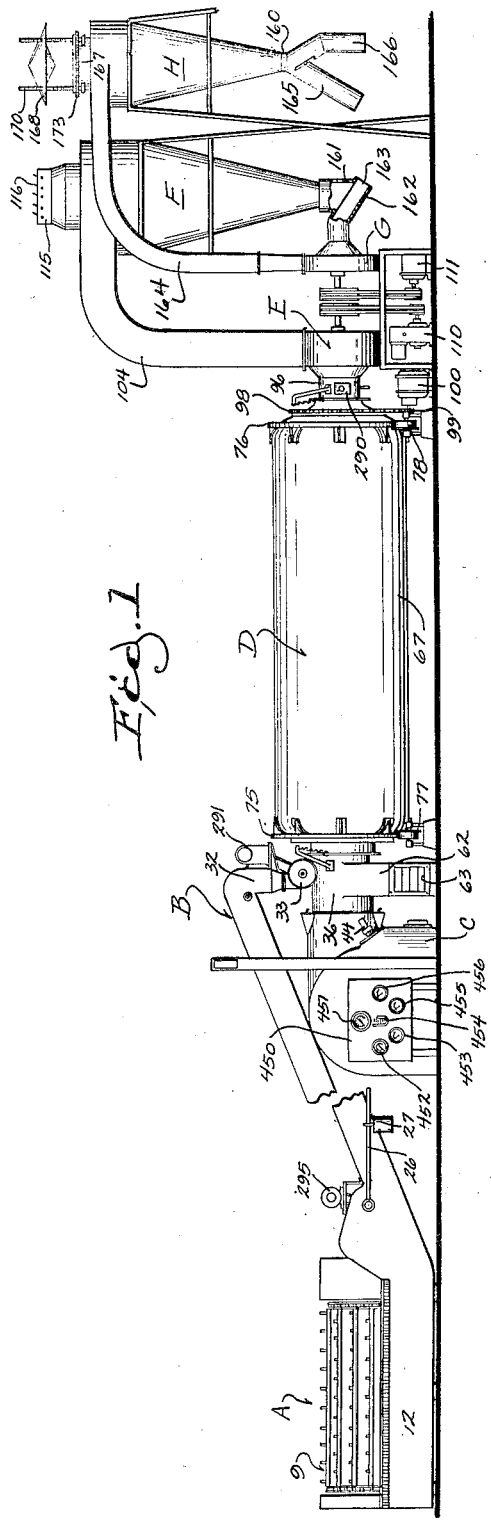
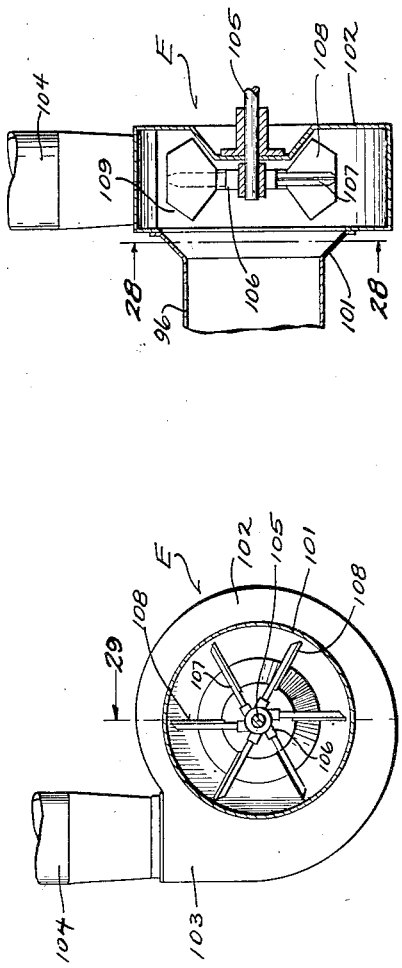
INVENTOR.
GERALD D. ARNOLD
BY
Wheeler, Wheeler & Wheeler
ATTORNEYS

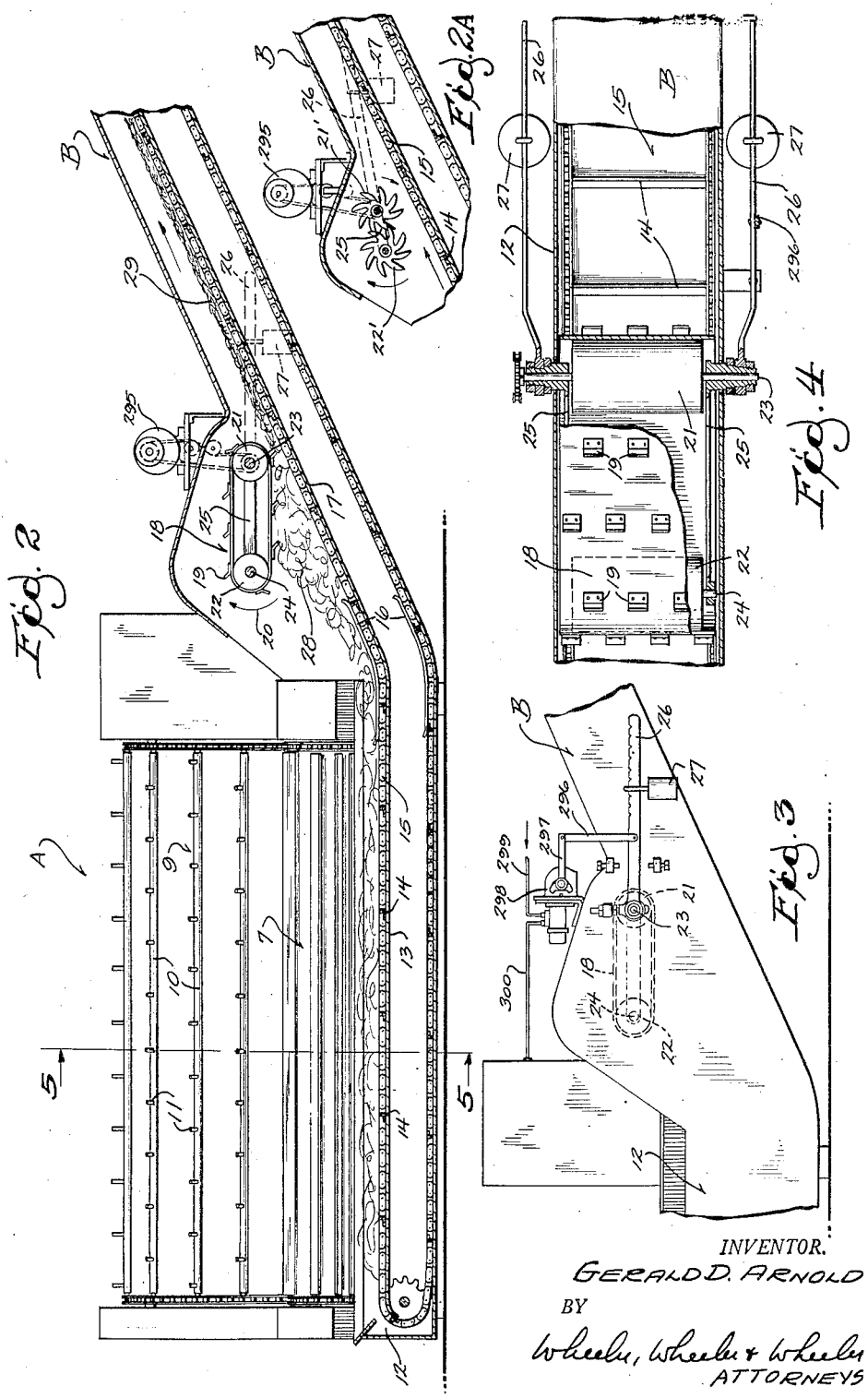

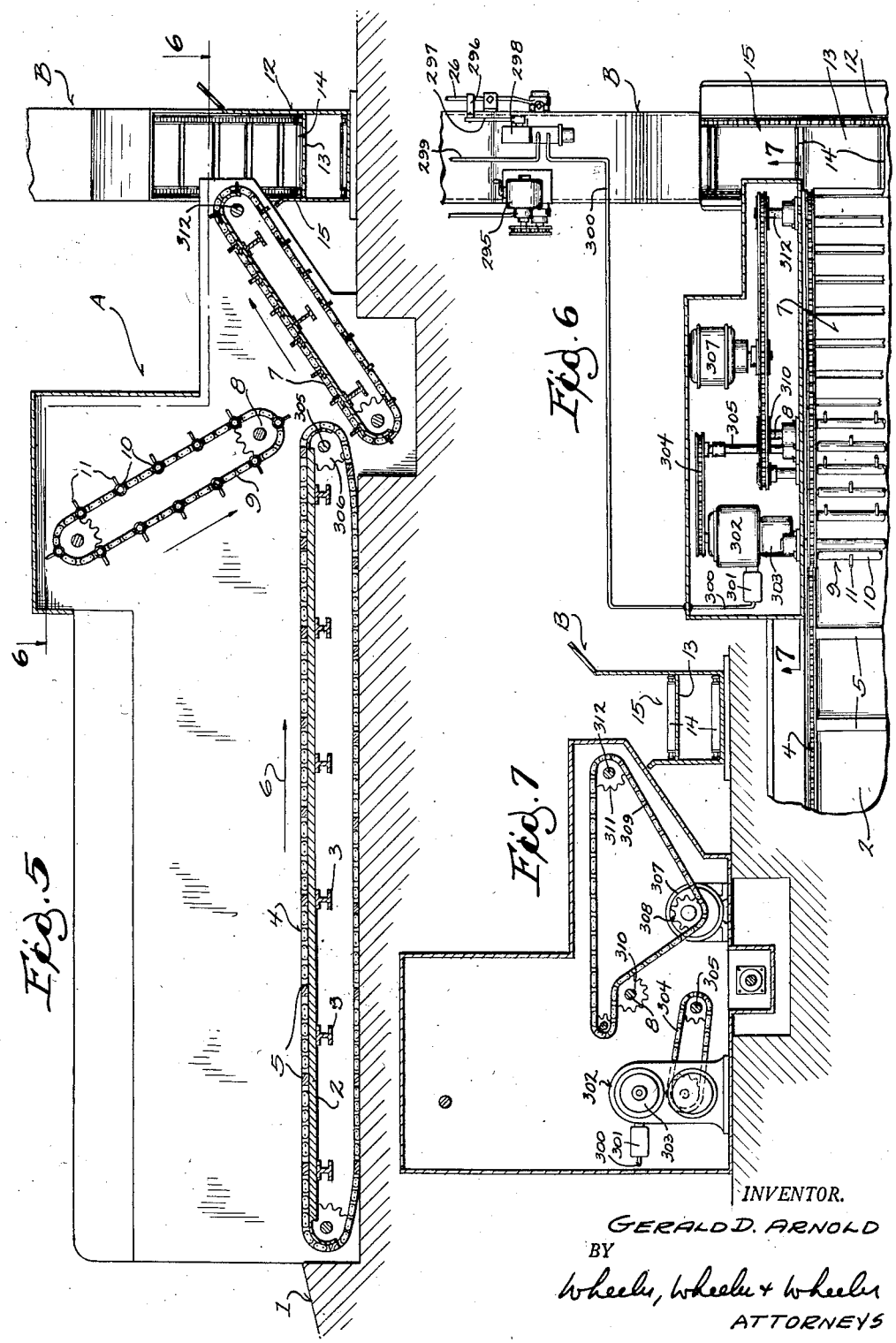

Feb. 4, 1958   G. D. ARNOLD   2,822,153
AGRICULTURAL DEHYDRATING SYSTEM
Filed Jan. 2, 1953   15 Sheets-Sheet 4
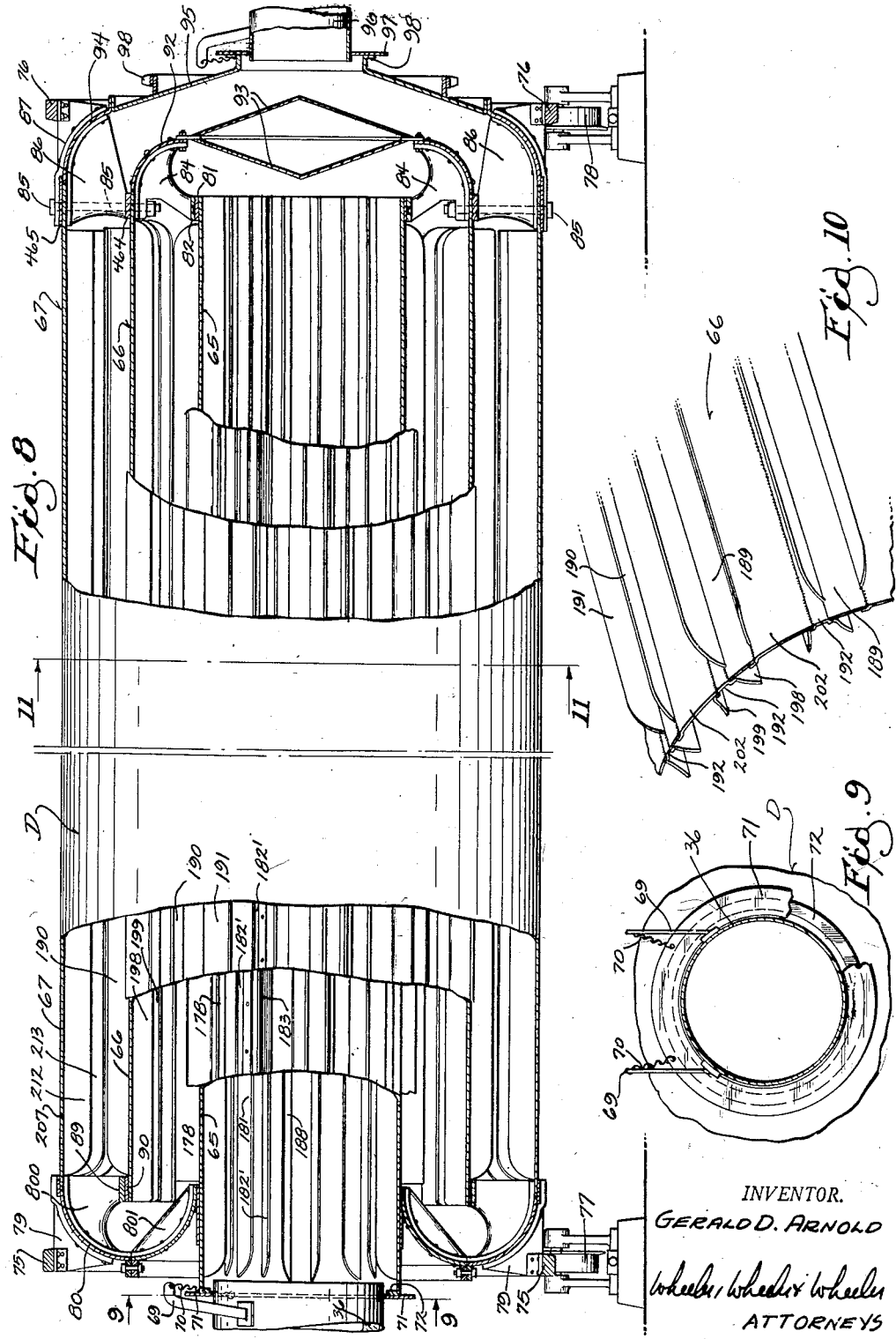
INVENTOR.
GERALD D. ARNOLD
Wheeler, Wheeler & Wheeler
ATTORNEYS

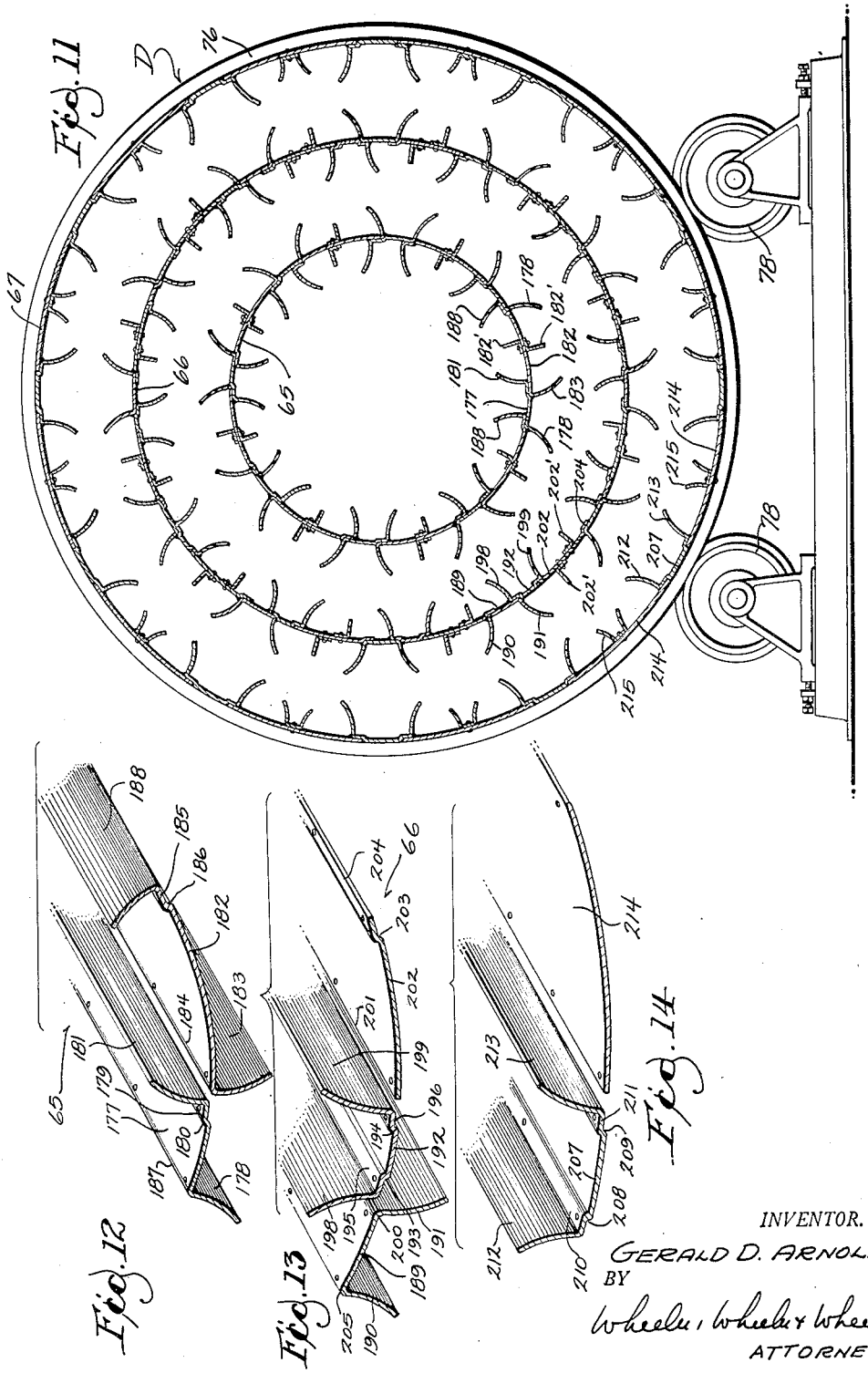

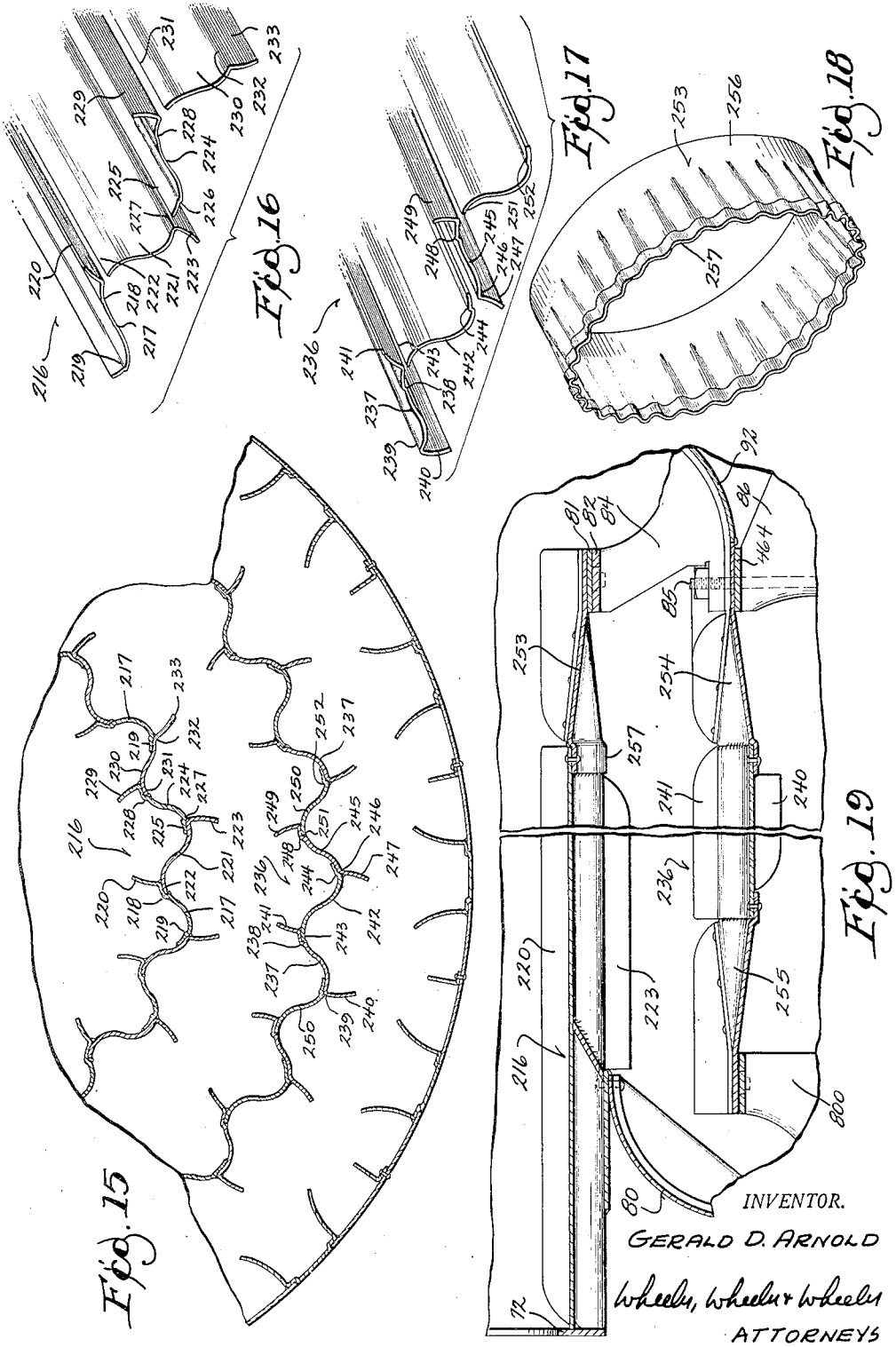

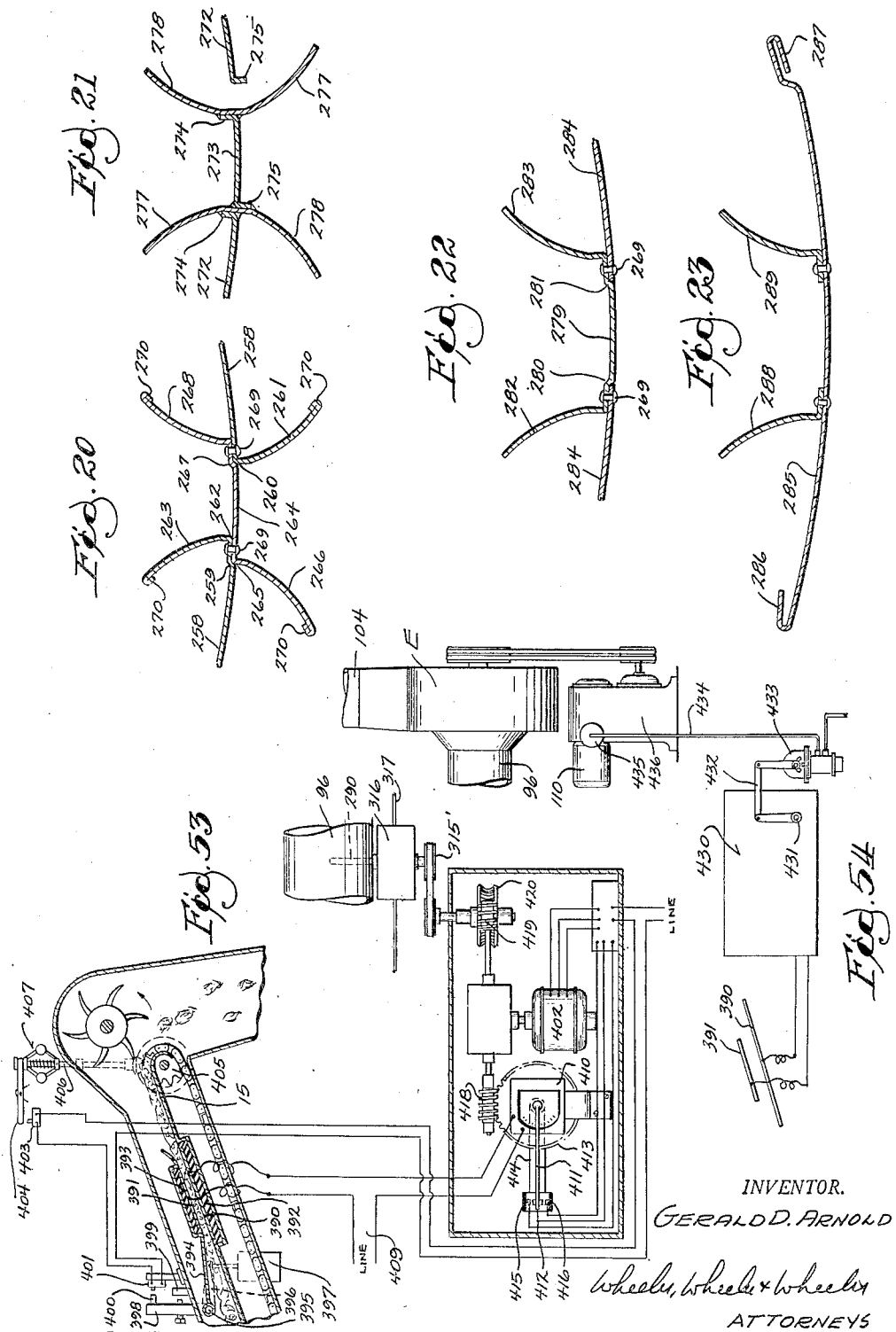

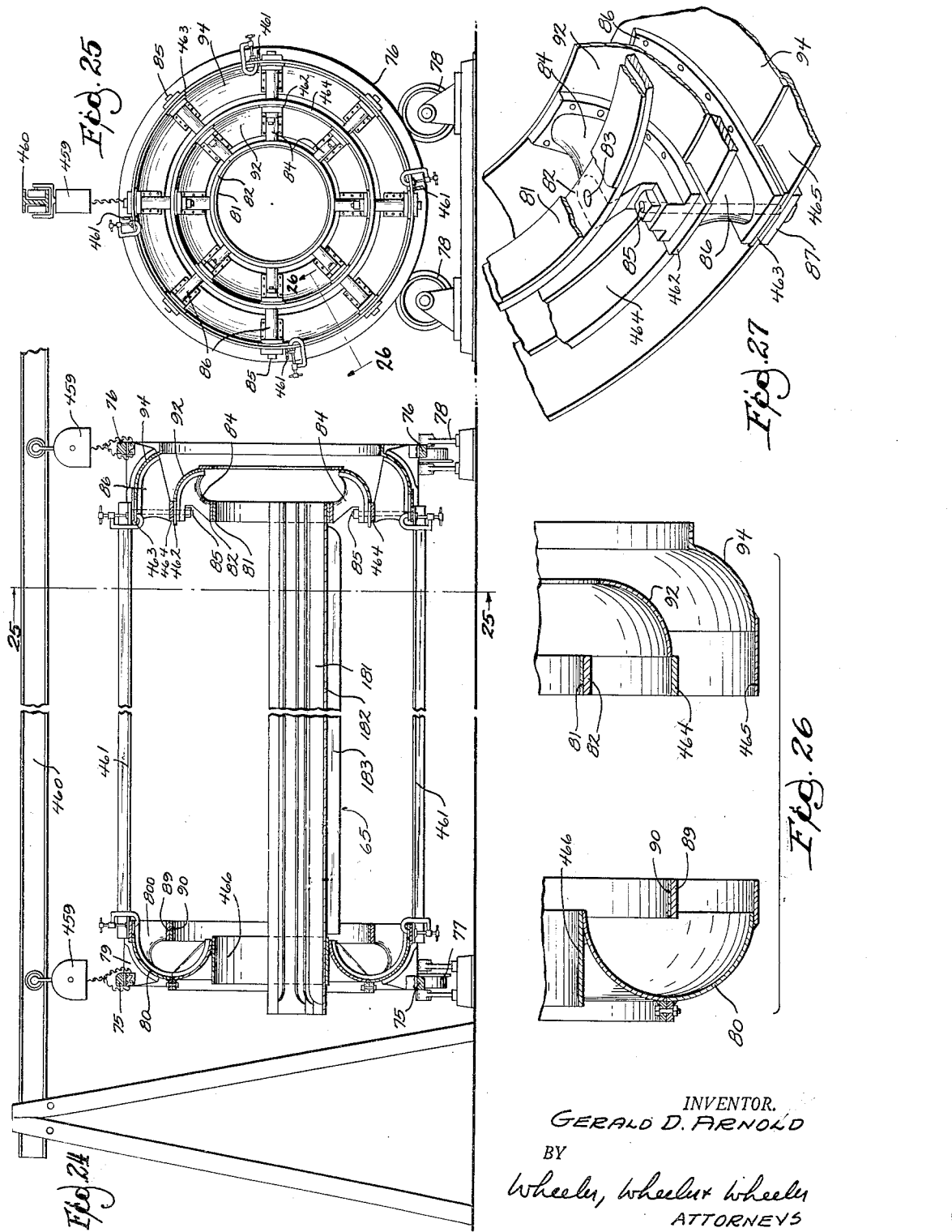

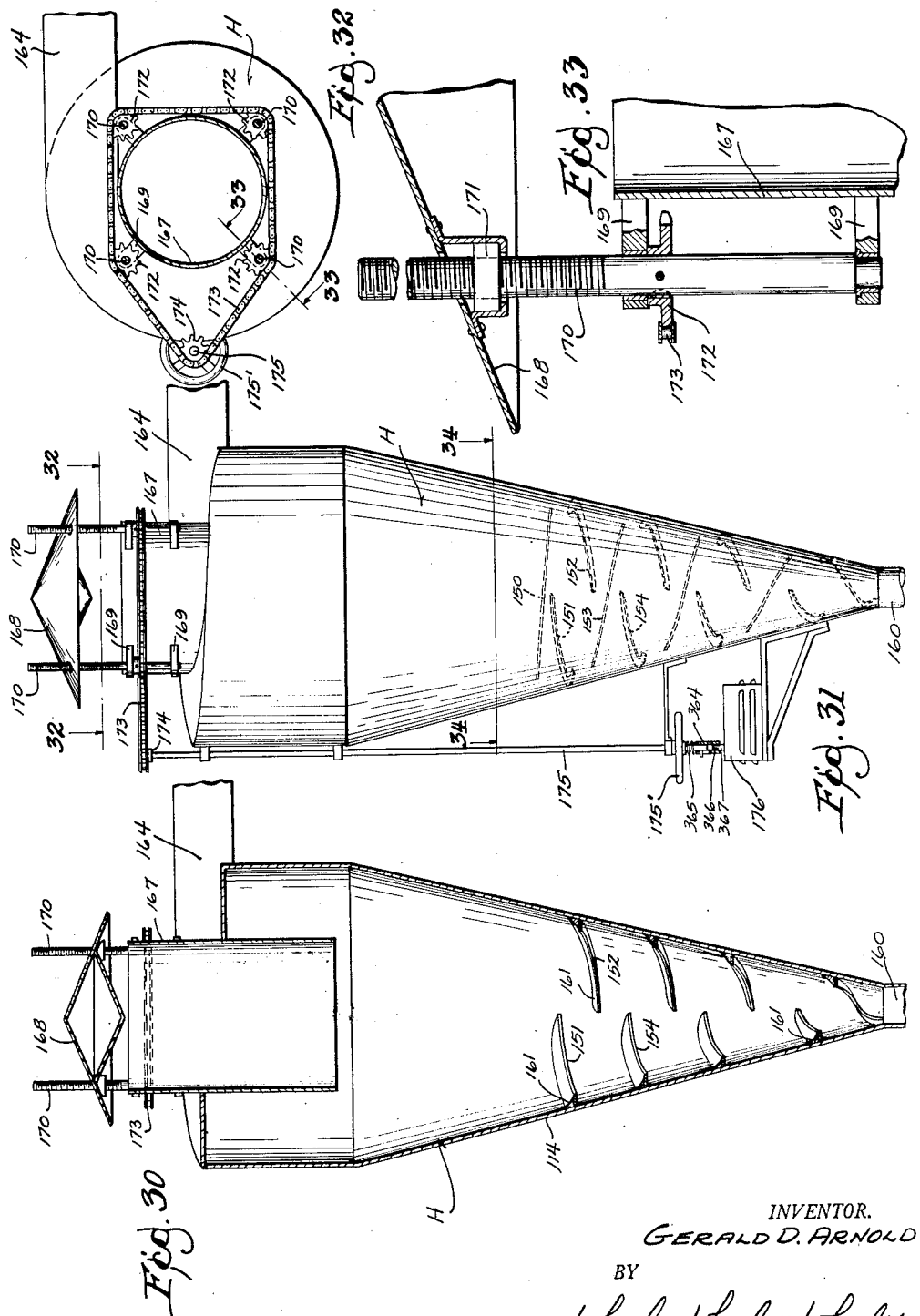

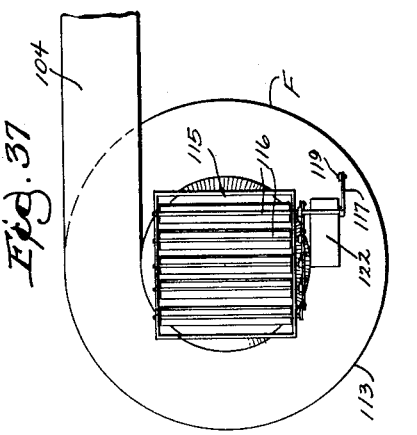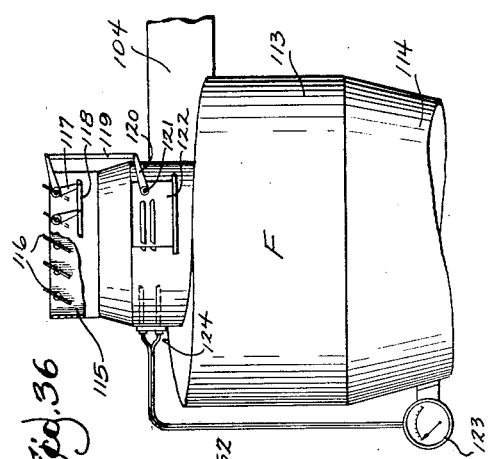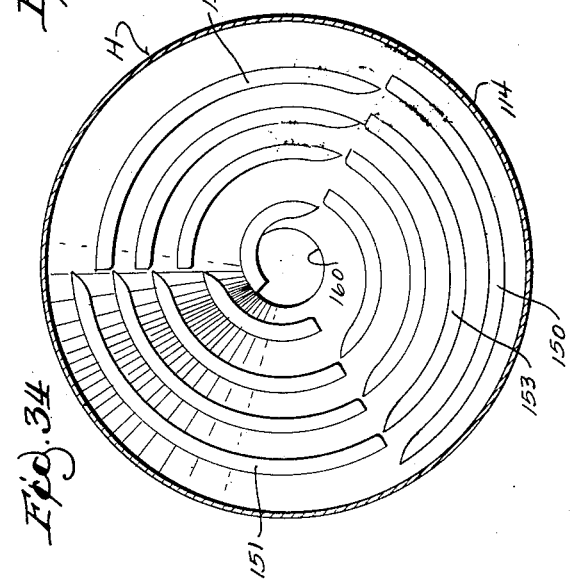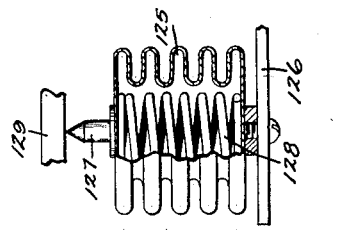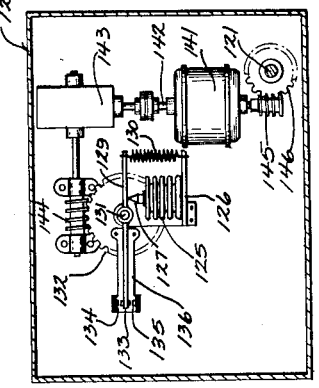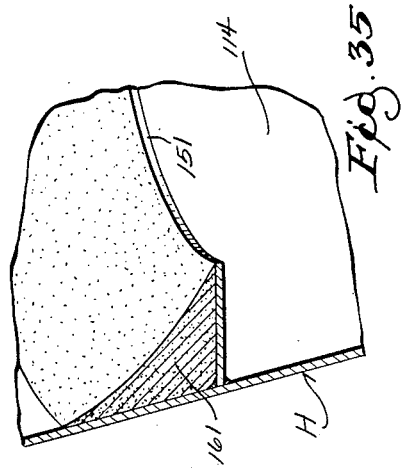
INVENTOR.
GERALD D. ARNOLD
BY
Wheeler, Wheeler & Wheeler
ATTORNEYS

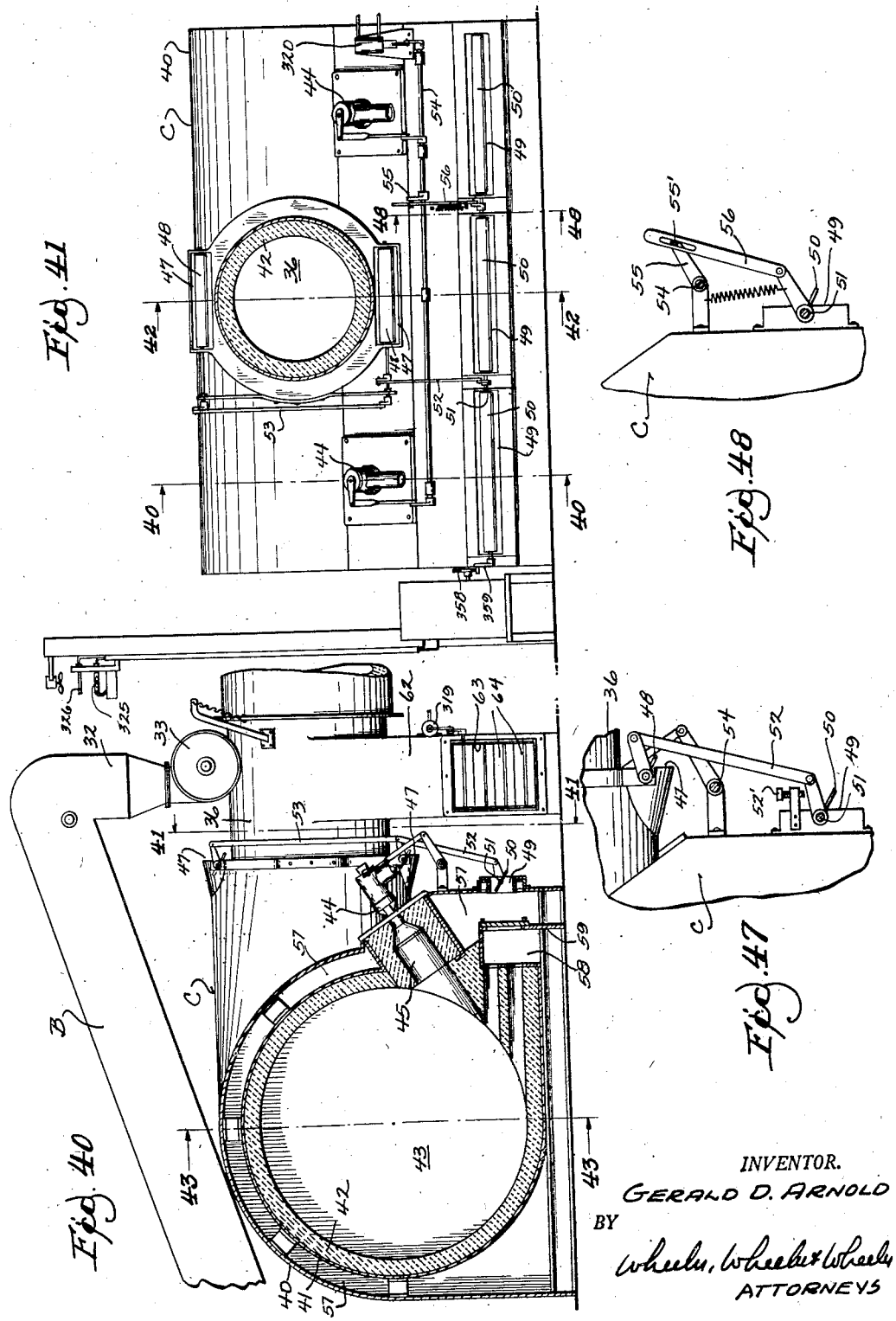

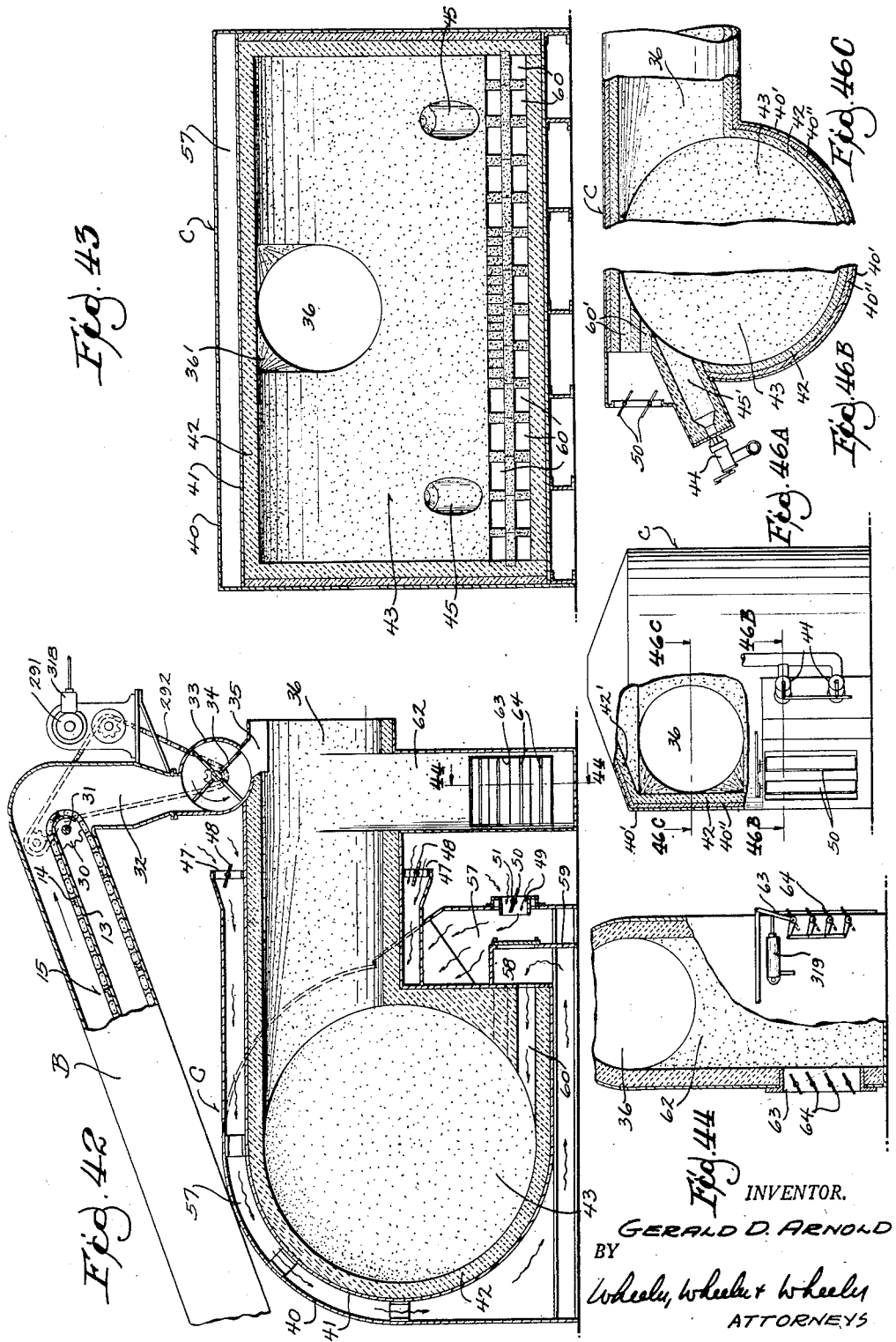

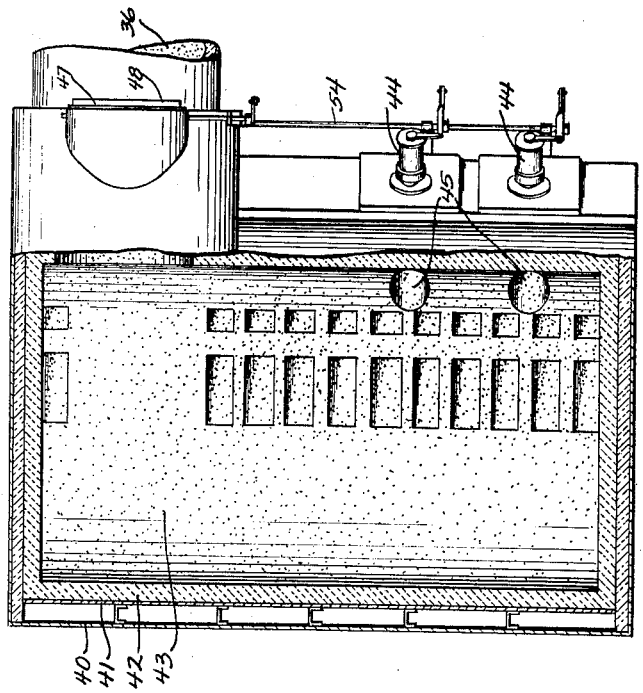
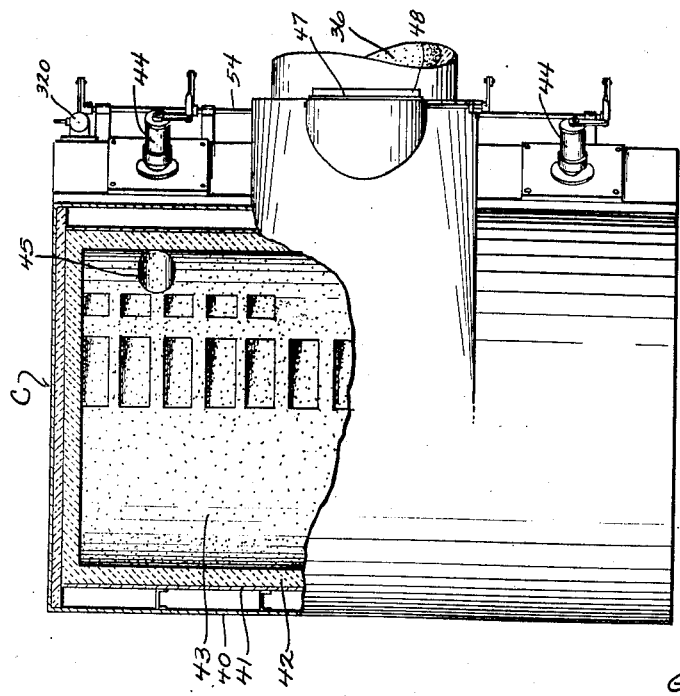

Feb. 4, 1958
G. D. ARNOLD
2,822,153
AGRICULTURAL DEHYDRATING SYSTEM
Filed Jan. 2, 1953
15 Sheets-Sheet 14
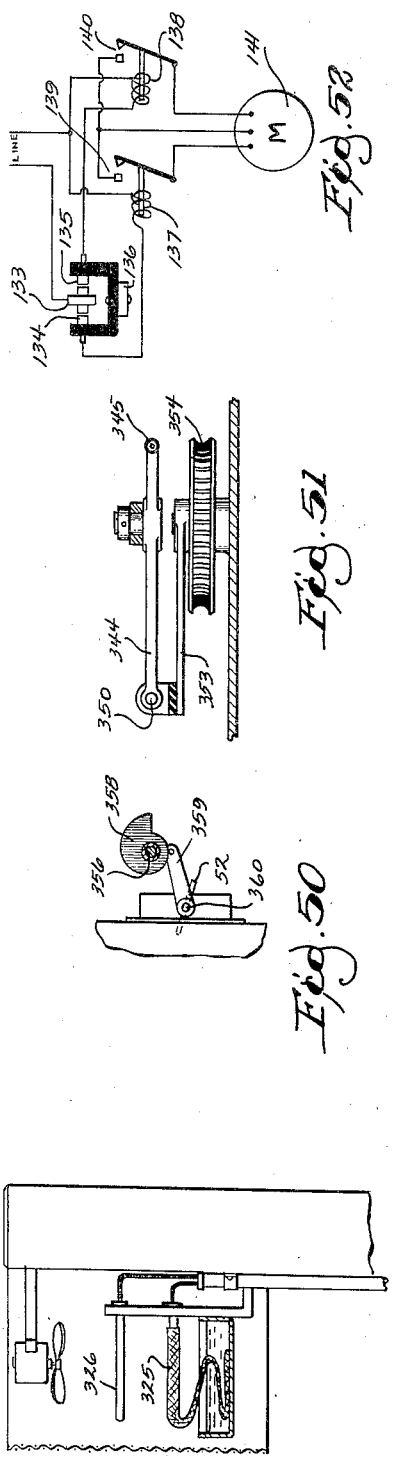
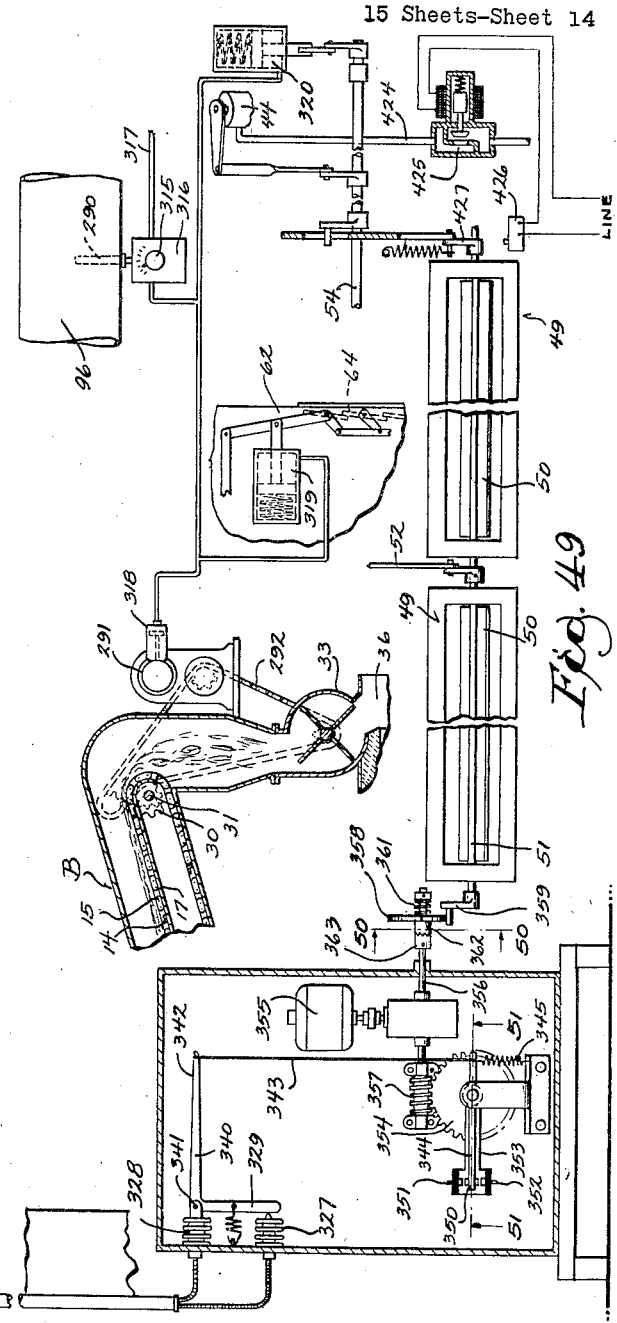
INVENTOR.
*GERALD D. ARNOLD*
BY
*Wheeler, Wheeler & Wheeler*
ATTORNEYS

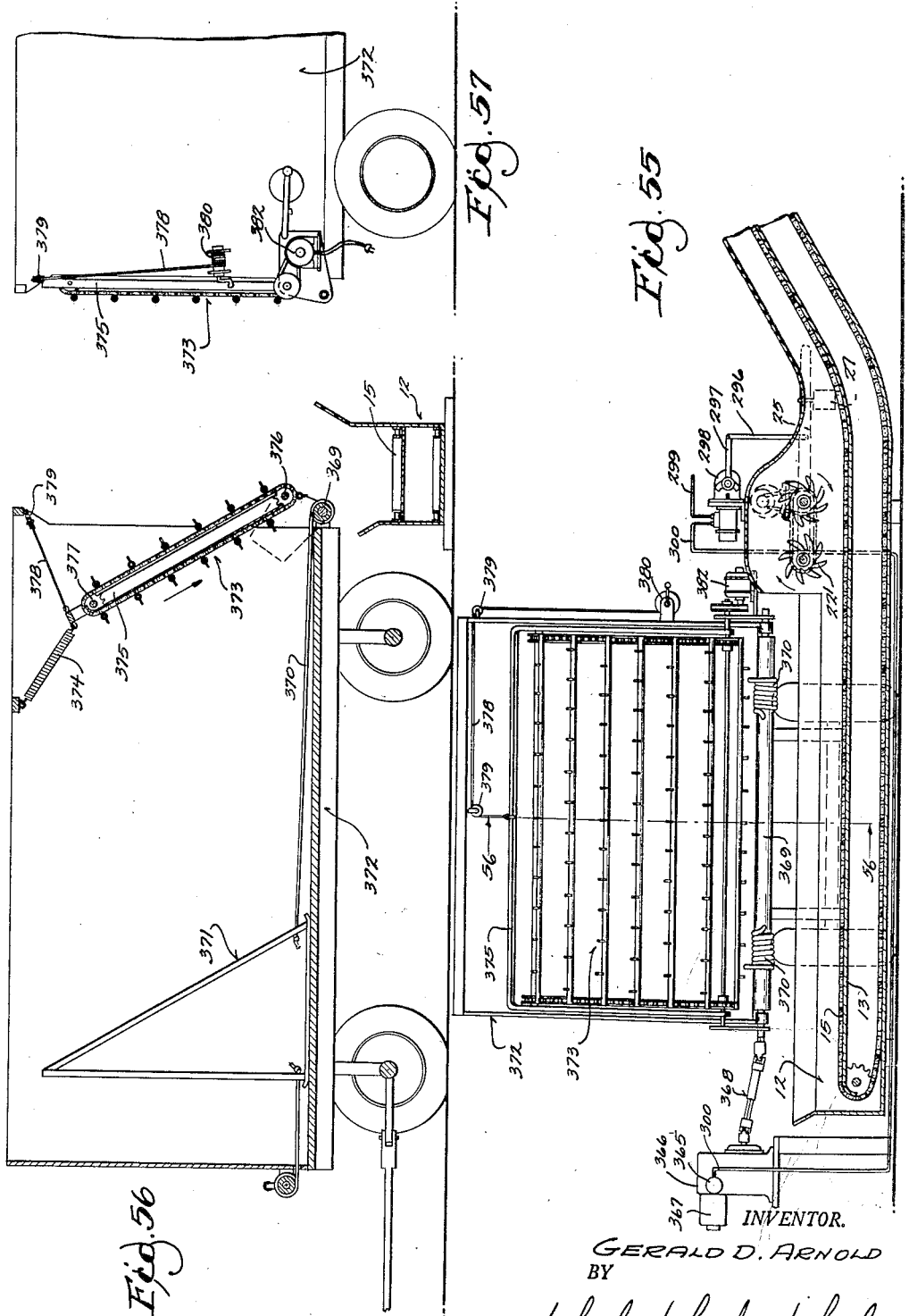

2,822,153
AGRICULTURAL DEHYDRATING SYSTEM

Gerald D. Arnold, Wauwatosa, Wis.

Application January 2, 1953, Serial No. 329,255

10 Claims. (Cl. 259—89)

This application relates to an agricultural dehydrating system. Included are improvements in the feeder, the furnace, the dehydrating drum and its seal, the blowers, the separators and the controls which automatically regulate the operation of the system as a whole and cooperate with the various improvements in the specific parts thereof.

The feeding arrangements include means whereby the material to be dried can be delivered into the drier on one or more than one consecutively operating conveyors, at least one of which is variable as to speed and automatically regulated by the control system. Desirably included are coacting sets of conveyors for assuring uniformity of flow of material at whatever rate is determined by the control system.

The control system not only varies the rate of feed of the material into the apparatus but varies the temperature and rate of flow of the air. For reasons hereinafter explained, the damper means heretofore proposed to be used for this purpose do not get the result herein sought and one of the improvements in the furnace is to provide damper means which will not only operate more effectively with the controls and the rest of the dehydrating system, but will operate to keep the furnace temperatures at their adjusted values and to protect the furnace lining from injury.

The burner or burners are directed tangentially into a cylindrical furnace chamber from which the outlet is also tangential and in the same sense of rotation as the gases. The outlet is axially remote from the burner so that the gases travel helically within the cylindrical furnace and leave without any abrupt change of direction.

Dehydrating air (in addition to air admitted at the burner to support combustion) is admitted tangentially immediately in advance of the burners so that the flame from the burners is cushioned by a helically moving current of cooler air which shields the furnace lining from the flame. This auxiliary air is desirably not cold atmospheric air, however, having first been passed about the furnace jacket from the admission dampers to the point of entrance in the furnace proper. There are one or more admission dampers opening into the jacket and while these are subject to a common control in accordance with the temperature of outlet gases leaving the dehydrator, at least one of the dampers has separately controlled limiting means automatically set in accordance with the humidity of the ambient air, thereby automatically achieving a regulation never heretofore possible to compensate for changes in humidity.

Other dampers admit auxiliary air directly into the furnace flue and are so connected with the automatic control system as to operate in opposition to the dampers which admit air through the furnace jackets to the furnace itself. This arrangement is useful primarily in shutting down the apparatus and it serves to keep the heat in the furnace, thereby avoiding the abrupt chilling of the furnace lining. This is particularly useful when the shutdown is temporary, since it avoids cracking of the lining, at the same time virtually instantly cutting off the flow of heat into the dehydrating drum.

In normal operation, the dampers for admitting air directly to the flue remain entirely closed and the air dampers controlling air admission to the furnace remain in a manually adjustable, wide-open position except as modified by the humidistat control to allow for changes in humidity in the ambient air. Desirably the drier should operate with high inlet temperature and low outlet temperature, the reduction in temperature being effected by evaporation of moisture from the material dehydrated. The rate of evaporation, and consequent reduction of temperature within the drum, depends upon the following factors, among others:

(1) The volume and velocity of the dehydrating gases.

(2) The extent to which the material to be dehydrated is distributed by showering action across the entire cross section of the drum.

(3) The degree of vacuum within the drum.

(4) The time required for material to go through the drum.

Opening the air admission dampers too widely will increase the velocity of flow of the dehydrating gases and will decrease the vacuum within the drum. Both of these factors operate to reduce dehydrating action and thereby to reduce the differential between inlet and outlet temperatures by decreasing the inlet temperature and increasing the outlet temperature with consequent waste of fuel and ineffective dehydration. On the other hand, if the air inlet openings are too far restricted, the material will be held in the drum for a longer time but the volume of gas through the drum may be inadequate to carry out the moisture, thereby reducing the capacity or rate of dehydration.

Still another control arrangement optionally used permits manipulation of the controls automatically in response to variation in moisture content of the material to be dehydrated. This feature is an alternative arrangement, there being opposed electrical contacts between which the material passes while confined under pressure, a delicate instrument being used to measure the variation in current flow between the contacts according to the moisture content of the material, there being a control device whereby the movement of the pointer of this instrument effects adjustment of the entire system, desirably by manipulation of the temperature control knob at the outlet thermostat in the same manner as the knob might be controlled manually but for this automatic arrangement. This moisture testing device also regulates the discharge fan speed to maintain the correct volume of pneumatic current through and vacuum within the drier drum at all times and which likewise might be controlled manually but for this automatic arrangement.

Alternatively the speed of the fan may be made responsive to the moisture content of the material to accelerate the flow of gases through the dehydrating drum in proportion as the moisture content of the incoming material is higher. Increase of fan speed not only increases the volume of drying gas to which the material is exposed but it also increases the vacuum in the drying drum, both of these factors accelerating dehydration without increase in the temperature of the drying gases. Only if these measures fail to achieve complete dehydration will the output temperature decrease to automatically effect an increase in the rate of burner operation to raise the temperature of the input gases.

Absolute accuracy in dehydration to a predetermined moisture content has never heretofore been achieved and is very important. If the dehydrated material is not adequately dried, it may heat or spoil in storage; it may be subject to loss of color and vitamin content; and it will be difficult to grind or will require more power for grinding.

Because of the impossibility of achieving dehydration accurately to any fixed standard in the use of prior art apparatus, it has heretofore been common practice to overdry some or all of the material in order to assure that none of it will be underdried. Over-dehydration involves not merely a waste of fuel but the disintegration of the overdried finer particles; the possible scorching of some of these; and the reduction of much of the material to dust which is either lost in the cyclone or is unpalatable to the stock to which it is fed.

The dehydrating drum has been greatly improved by making it in separate longitudinal sections in such form as to facilitate knockdown shipment of the drum and assembly at the point of use. It is very important to the successful operation of a rotatable drum dehydrator that the entire interior of the drum be filled with showers of the material to be dehydrated, thereby using all portions of the stream of dehydrating gas. By appropriate subdivision of the various shells in the prefabricated segments, including not only shell segments but requisite material-lifting flights, I make it possible to ship such segments separately, and, when assembled and in operation, to assure proper showering action. Desirably, in most of the embodiments herein disclosed, the segments respectively include portions of the shell wall and flights in unitary connection with such portion, the whole being organized for assembly by welding, riveting or otherwise with a minimum number of joints.

In the dehydrating of leafy forage crops, it is desirable to avoid breaking the leaf material from the stem and to minimize the pulverization of the dried material. I have found that much of the observed pulverization previously experienced is attributable to the blower whereby such material is transferred from the dehydrator to the separating apparatus and can be avoided by a special blower construction in which the runner does not wholly fill the blower housing and space is provided annularly outside of the runner through which the solids can enter the blower housing and from which the solids can leave such housing tangentially without ever passing through the runner to be impacted by its blades.

I have effected a very substantial cooling of the otherwise unduly hot material, thereby promoting preservation of its vitamin content. I do this by admitting the material to a current of ambient air after initial separation from the gases used in dehydration. A special air intake at the material outlet of the first cyclone separator is inclined for the gravity discharge of stones and other foreign matter while at the same time entraining the separated dehydrated solids in ambient air to be cooled thereby in traversing a second separator.

The two separators themselves have been improved to achieve more perfect separation and prompt discharge of all solids, at the same speed irrespective of particle size or weight. This avoids pulverization and the excessive trituration of light matter attributable to prolonged dwell in the cyclone. This improvement includes helical flights of special design which engage the solids to feed them downwardly without disturbing their continuity and smoothness of helical rotation. It is desirable that the initial mechanical engagement of these flights with the material be effected at the precise point where the air or gas changes its direction to move upwardly toward the central outlet. In my research, I have discovered that this point varies according to the barometric pressure and can be controlled by regulating the capacity of the gas outlet. Accordingly, I provide means whereby the capacity of the gas outlet is automatically regulated to maintain the gas return point at the proper level within the separator in relation to the flights which act on the solid material, this being done automatically in accordance with changes in barometric pressure.

The dehydrating operation is a function of the temperature of the admitted gases, the relative humidity of the ambient air from which such gases are derived, the moisture content of the material to be dehydrated, the rate of flow of the material and the rate of flow of the gases, as well as the volume of the latter. Another very important factor is the showering of the material across the stream of dehydrating gas. The showering is a relatively constant factor, whereas the other factors above mentioned are variable. Since the advance of the material through the dehydrating drum is dependent upon the increments of advance thereof effected by the gases in the course of each showering action, it will be evident that the greater the number of times the material is lifted and dropped across the stream of gases, the more rapid may be its advance through the dehydrating drum. However, the rate of advance may be increased or decreased according to the velocity of the dehydrating gases. Automatic controls have heretofore depended almost exclusively upon the outlet temperature of the gases discharged from the dehydrating drum. For many purposes, this temperature is a satisfactory criterion, since the initially hot gas is cooled only to the extent that it has evaporated water vapor from the material to be dehydrated. Consequently, if the temperature of the discharged gas rises, it may mean that an inadequate supply of material is being received or that the burners are operating at too high a capacity or that the material fed into the machine is already partly dry, etc.

One remedy heretofore proposed has been to have the outlet thermostat control the rate of input feed of material to be dried and also control the burner and the air admission damper to reduce burner temperature and increase the amount of air admitted in the event of temperature rise at the outlet. However, an increase in the amount of air admitted will accelerate the flow of gas through the dehydrating drum and therefore accelerate the rate of movement of the material through the drum. This will be contrary to what is actually needed in the event that the rise in outlet temperature is due to an increase in the humidity of the ambient air. Accordingly, I have provided, in the present invention, a cam which limits the opening of the furnace dampers in accordance with ambient air humidity.

Cross reference is made to my copending application Serial No. 52,269, filed October 1, 1948 for Furnaces now Patent No. 2,672,108 dated March 16, 1954.

In the drawings:

Fig. 1 is a general view in side elevation of a dehydrating system embodying my invention.

Fig. 2 is an enlarged detail view partially in section and partially in side elevation of the feeder shown in Fig. 1.

Fig. 2A is a view similar to Fig. 2 showing a slightly modified feeding control arrangement.

Fig. 3 is an enlarged fragmentary detail view in side elevation of portions of the feeding mechanism which appear in section in Fig. 2.

Fig. 4 is a fragmentary view partially in plan and partially in horizontal section of apparatus shown in Fig. 3 and Fig. 2.

Fig. 5 is a detail view taken in section on the line 5—5 of Fig. 2.

Fig. 6 is a detail view taken in section on the line 6—6 of Fig. 5.

Fig. 7 is a detail view taken in section on the line 7—7 of Fig. 6.

Fig. 8 is a fragmentary view partially in side elevation and partially in longitudinal section showing the dehydrating drum on a larger scale than in Fig. 1.

Fig. 9 is a detail view taken in section on the line 9—9 of Fig. 8.

Fig. 10 is a fragmentary perspective view of an end of an intermediate shell portion of the drum.

Fig. 11 is a view taken in section on the line 11—11 of Fig. 8.

Figs. 12, 13 and 14 are fragmentary perspective views showing in section the component segment of which the inner intermediate and outer drums are respectively assembled.

Fig. 15 is an enlarged fragmentary detail view in transverse section through a modified embodiment of the dehydrating drum.

Figs. 16 and 17 are fragmentary perspective views respectively illustrating component segments used in making up the inner and intermediate shells of the drum construction shown in Figs. 15.

Fig. 18 is a view in perspective of an adapter ring required where the shells have the convoluted form shown in Figs. 15 to 17.

Fig. 19 is an enlarged fragmentary detail view in cross section through opposite end portions of the inner and intermediate shells used in the construction of Figs. 15 to 18.

Figs. 20, 21 and 22 and 23 respectively show a transverse section of various modified embodiments of segment and flight units which may be prefabricated and assembled to make dehydrating drum and shell flights in accordance with this invention.

Fig. 24 is a view in axial section through a dehydrating drum in process of assembly in accordance with this invention.

Fig. 25 is a view taken in section on the line 25—25 of Fig. 24.

Fig. 26 shows in enlarged fragmentary section the drum as used in the operation shown in Fig. 24.

Fig. 27 is an enlarged fragmentary view in perspective showing portions of the drum heads and gussets and temporary spacers as they appear during an assembly operation.

Fig. 28 (Sheet 1) is a view taken in section on the line 28—28 of Fig. 29.

Fig. 29 is a view taken in section on line 29—29 of Fig. 28.

Fig. 30 is an enlarged detail view in axial section through a cyclone separator made in accordance with the present invention.

Fig. 31 shows the separator in side elevation.

Fig. 32 is a view taken in section on the line 32—32 of Fig. 31.

Fig. 33 is an enlarged view taken in section on the line 33—33 of Fig. 32.

Fig. 34 is an enlarged view taken in transverse section on the line 34—34 of Fig. 31.

Fig. 35 is a further enlarged fragmentary detail view in axial section through the separator and one of its internal flights.

Fig. 36 is an enlarged fragmentary detail view of another separator embodiment partially in side elevation and partially in axial section.

Fig. 37 is a plan view of the embodiment shown in Fig. 36.

Fig. 38 is a detail view in side elevation of the damper control mechanism used in the embodiment of Figs. 36 and 37.

Fig. 39 is a further enlarged view partially in side elevation and partially in section showing a detail of the barometrically responsive element used in the control mechanism.

Fig. 40 is an enlarged detail view of the furnace on the section indicated at 40—40 in Fig. 41.

Fig. 41 is a transverse section through the flue pipe at the rear of the furnace on the line indicated at 41—41 in Fig. 40.

Fig. 42 is a view taken in section on the line 42—42 in Fig. 41.

Fig. 43 is a view taken in section on the line 43—43 of Fig. 40.

Fig. 44 is a view on a reduced scale taken in section on line 44—44 of Fig. 42.

Fig. 45 (Sheet 13) shows the furnace in plan, partially broken away to a horizontal section.

Fig. 46 is a view in horizontal section of a somewhat modified embodiment of the furnace.

Fig. 46A (Sheet 12) is a view in side elevation, partially broken away to the line 46A—46A in Fig. 46C, showing on a reduced scale a further modified embodiment of the invention in which a furnace has a cylindrical combustion chamber with a vertical axis.

Fig. 46B is a view taken in section on the line 46B—46B of Fig. 46A.

Fig. 46C is a view taken in section on the line 46C—46C of Fig. 46A.

Fig. 47 (Sheet 11) is a view in side elevation of damper controls for the furnace, the latter being fragmentarily illustrated.

Fig. 48 is another fragmentary view in side elevation of a damper controlling linkage.

Fig. 49 (Sheet 14) is a view partially in side elevation and partially in section diagrammatically illustrating the various thermostatic and hydromatic controls of the material feed burners and dampers.

Fig. 50 is a view taken in section on the line 50—50 of Fig. 49.

Fig. 51 is a view taken in section on the line 51—51 of Fig. 49.

Fig. 52 is a circuit diagram of the arrangement whereby a sensitive instrument may be used to control a motor having considerable power.

Fig. 53 (Sheet 7) diagrammatically illustrates an optional arrangement whereby the moisture content of the material to be processed may be used to adjust the control system.

Fig. 54 is a view diagrammatically illustrating a modification of the device of Fig. 53.

Fig. 55 (Sheet 15) is a view in longitudinal section through a modified feeding conveyor arrangement in which controls similar to those heretofore shown are here employed to control the functioning of a self-unloading vehicle, the latter being illustrated in rear elevation.

Fig. 56 is a view taken in section on the line 56—56 of Fig. 55.

Fig. 57 is a fragmentary detail view of the rear end portion of the self-unloading vehicle as it appears in side elevation viewed in a direction opposite to that of Fig. 56.

The general organization of the dehydrator comprises a receiver A, feeding conveyor B, furnace C, dehydrating drum D, blower fan E, cyclone separator F, blower fan G, and cyclone separator and bagger H, all as shown in Fig. 1.

The receiver A and many of its component parts are illustrated on Sheets 2 and 3 in Figs. 2 to 7 inclusive. Referring to Fig. 5, truckloads of produce to be dried can be driven up the ramp 1 onto a platform 2 supported by beams 3 of such strength as to support the truck and its load. Operating over the platform is a conveyor 4 which operates sufficiently slowly so that its cross slats 5 can be forced beneath the truck wheels without being arrested thereby. The produce is dumped onto the platform 2, is delivered rearwardly by the conveyor in the direction of arrow 6, and discharged onto an upwardly inclined conveyor apron 7. In reaching this point, the material passes below the lower guide sprocket 8 of a relatively fast moving conveyor 9 which includes cross bars 10 having projecting fingers 11 for loosening up the material and distributing it on conveyor apron 7.

The material is discharged from conveyor apron 7 into the feed conveyor trough 12 onto the table 13, this being traversed by the upper flight 14 of conveyor 15. The table 13 is substantially horizontal for the full width of apron 7, as best shown in Fig. 2. Beyond such apron, the conveyor chains pass beneath guides 16 and the table extends upwardly at an incline as shown at 17. Material carried upwardly upon table portion 17 by conveyor 15 is leveled off to uniform depth by conveyor 18 which may comprise an apron as best shown in Figs.

2 and 4 provided with projecting lugs 19 having a rearward rake with respect to the direction of conveyor movement indicated by the arrow 20. This conveyor operates over pulleys 21 and 22 on shafts 23 and 24, respectively. A conveyor frame 25 connecting such shafts is pivoted coaxially with shaft 23 and counterbalanced, externally of trough 12, by arms 26 upon which counterbalancing weights 27 are longitudinally adjustable as best shown in Figs. 2, 3 and 4. This arrangement leaves pulley 22 floating, so that it may readily rise when the produce accumulates beneath it in the manner indicated at 28 in Fig. 2. The resistance to upward movement of that end of conveyor frame 25 in which shaft 24 and pulley 22 are supported will obviously depend on the position of the counterweights 27. As will hereinafter be pointed out, I may use the pivotal movement of the conveyor frame, in response to accumulations at 28, to control the rate of operation of receiving conveyor 4 to the end that the feed of this conveyor will be retarded when excessive material accumulates on conveyor 15. Since all of the material on conveyor 15 must pass beneath pulley 21, and since this pulley operates on a fixed center, the material carried by conveyor 15 beyond this pulley will be reduced to a substantially uniform level as shown at 29 of Fig. 2.

Instead of pulleys 21 and 22 and belt 18, the floating frame 25 may carry the toothed rotors 21' and 22' as shown in Fig. 2A, the operation being similar to that above described.

At their upper ends, the chains 14 of conveyor 15 pass over sprockets 30 on a shaft 31, as best shown in Fig. 42 on Sheet 12. The material is here discharged to fall through hopper 32 into the rotary charger housing 33 in which there is a paddle-type rotor 34 for delivering the material through port 35 into the flue pipe 36 which connects the furnace C with the dehydrating drum D. During dehydrating operations, the flue pipe 36 is full of high velocity gases at high temperatures of the order of 1400° to 1800° F. These gases are partly products of combustion and partly air. The heat is derived from the burning of fuel in the furnace C in the manner now to be described, reference being made to Figs. 40 to 46A on Sheets 11, 12 and 13.

The furnace may comprise an outer wall or jacket 40 and an inner wall 41 lined with refractory material at 42. The refractory lining 42 may also extend into the flue 36 which extends trangentially from the combustion chamber 43 as best shown in Fig. 42. The combustion chamber is desirably cylindrical. Flue 36 may open from the center as shown in Fig. 41 and Fig. 45, or it may open toward one end as shown in the modified embodiments of Figs. 46 and 46A. In any case, if the flue 36 is circular, in accordance with conventional practice, it is expanded at its inlet 36' (Fig. 43, Sheet 12) into tangency for the full width of the flue in order to permit unimpeded flow of gases from the combustion chamber into the flue. But for such expansion, the flue would be tangent to the combustion chamber wall only at a single point.

Conventional burners 44 are directed into burner pockets 45 which are substantially tangential respecting combustion chamber 43 and axially offset from the flue through which the gases escape from such chamber. The direction of tangency of the burners is in the same sense of rotation as the direction of tangency of the flue so that the products of combustion discharge tangentially into the chamber and thereby caused to rotate therein will pass helically through the chamber and out the flue without any sharp change of direction. In the construction shown in Fig. 40, the burner pockets 45 are in the back of the furnace, at the same side of its vertical center line as that from which the flue issues. In the construction shown in Figs. 46A and 46B, the burner pockets 45' are at the opposite side of the furnace from the flue. Ordinarily they will be axially remote from the flue, as suggested in Fig. 46A but the same helical flow of gases will occur in the combustion chamber, regardless of the specific location of the inlets and outlets.

Apart from the air supplied to the burners for the combustion of the fuel, drying air is admitted to the combustion chamber to be admixed with the flue gas and heated thereby, not only increasing the total volume of hot gas, but tempering the heat of the products of combustion. Some of the tempering and drying air is admitted through damper ports 47 controlled by dampers 48 and located immediately beneath and above the flue 36 as shown in Fig. 41. The great majority of such air is admitted through three damper ports 49 controlled by dampers 50, all mounted on the same rock shaft 51 as shown in Fig. 42 and connected by links 52 and 53 to operate in unison with dampers 48. All dampers are accurately set to a maximum open position (which will vary for different products to be dried) by a stop 52' (Fig. 47). If the damper opening is too large, fuel will be wasted; if too small, dryer capacity will be restricted.

All of the admitted air finds its way into the jacket space 57 (Figs. 40 and 42) and passes completely around the inner furnace wall 41 to a plenum chamber at 58 separated by partition 59 from the point of admission. From the plenum chamber 58, numerous ports 60 enter the combustion chamber 43, desirably throughout the length thereof, as best shown in Figs. 40 and 43. The disposition of ports 60 is also substantially tangential, but these ports are angularly offset around the periphery of combustion chamber 43 from the path of the products of combustion admitted through the burner pockets 45. Thus the atmospheric air, which has partially been heated by the outside of the wall of the furnace in traversing the jacket space 57, tends to spread out as an annular cushion between the refractory lining 42 and the flame or products of combustion from the burners.

Since the air is much colder than the products of combustion and is whirling in the same direction, there will be considerable stratification, the heavier cool air remaining interposed between the hot gases and the refractory lining. It has been found that this gives a great deal of protection to the refractory material and substantially completely protects it against fusing and cracking. However, as the products of combustion and the air leave the combustion chamber 43 and enter the flue, they are no longer whirling in stratified layers but become thoroughly intermixed to enter the dehydrating drum as a substantially homogeneous stream of drying gases.

Inasmuch as it is quite difficult to line a horizontal cylinder with fire brick or other refractory material, there are substantial advantages in a furnace in which the cylindrical combustion chamber is set on a vertical axis as suggested in Figs. 46A, 46B and 46C (Sheet 12). In such a case, the strong supporting wall previously required for the refractory material can be wholly or substantially eliminated and the fire brick become self-supporting. It is a simple matter to lay up a cylindrical wall of fire brick in this device and to provide a crowned fire brick roof at 42'. Even the jacket 40' may be made lighter in this construction, since it is not obliged to provide support for anything other than itself. In the construction illustrated, I use insulation 40" retained by shell 40' about the refractory lining 42. The blanket of cold air intervening between the products of combustion and the refractory lining makes it unnecessary to circulate cooling air around the lining. Accordingly in this construction, the dampers 49 admit the supplemental air through passages 60' directly into the combustion chamber as clearly shown in Fig. 46B. Due to these and other advantages, there are great savings of expense in erection of this furnace.

To illustrate the fact that the flue and inlet arrangement may not be precisely as shown in Fig. 40, I have shown in Fig. 46A on Sheet 12 of the drawing an alternative embodiment in which the burner pocket 45' tangentially enters the combustion chamber in the upper front portion thereof. The air port damper 50 is unchanged except in location, being arranged to admit air directly into the combustion chamber in a tangential direction through the ports 60' which open into the combustion chamber 43 near the top thereof.

Under certain circumstances, it becomes desirable to increase the amount of air in relation to the amount of flue gas, or completely to substitute air for flue gas. To this end, the flue pipe 36 is provided with an inlet at 62 (Figs. 40, 42 and 44), the inlet having large admission ports 63 at its opposite sides controlled by cross-connected shutters or dampers 64 which operate in unison and desirably opposite to the furnace inlet dampers above described.

The pressure differential which produces movement of the current of gases through the flue and the dehydrating drum results from the operation of a powerful blower at the outlet of the drum. A substantial degree of depression or partial vacuum exists within the dehydrating drum as a result of the fact that the gases are circulated by suction at the drum outlet instead of being subjected to superatmospheric pressure at the drum inlet. In addition to the fact that this partial vacuum in the dehydrating drum assists in the removal of water vapor from the produce which is being dehydrated, the arrangement facilitates the sealing of the connection between the flue and the drum, this being effected by a floating seal which atmospheric pressure holds to the end of the drum as presently to be described.

The dehydrating drum as best shown in Figs. 8 and 11, is desirably of the triple pass type having an inner tube or shell 65, an intermediate shell 66 and an outer shell 67. The inner tube or shell 65 is approximately concentric with and spaced somewhat outside of the flue pipe 36. Arms 69 carried by the flue pipe (Figs. 4 and 9) support by means of chains 70 a sealing ring 71 which may be made of metal or a brake lining material or the like. The ring fits closely to the pipe 36. By reason of the partial vacuum existing within the dehydrating drum D, atmospheric pressure forces the sealing ring 71 against a flange 72 provided at the end of tube 65. It will be understood that the entire drum D is rotatable. The bearing contact between the sealing ring 71 and flange 72 readily permits this rotation and the suspension of the ring leaves it free to move inwardly and outwardly in response to any irregularity in the bearings and accommodated any reasonable misalignment between the drum and the inlet and outlet tubes.

The various tubes or shells comprising the drum D are mounted in the general organization disclosed in my Patent No. 2,618,865 granted November 25, 1952. The riding rings 75, 76 are carried by pairs of rolls 77, 78 mounted in suitable bearings as shown in Fig. 11. The ring 75 is connected by gussets 79 with a semi-toroidal head 80 which is fixed by welding or the like to the outer shell 67 and the inner tube 65 at the inlet end of drum D, the inner tube 65 projecting beyond the head to receive bearing contact with seal 71 as above described.

At the other end of drum D, the inner tube 65 has a slip ring 81 fixed to it and this slides within an apertured ring 82 (Fig. 27, Sheet 8) held to gusset 84 by a peg 83 integral with the gusset 84 anchored to the intermediate shell 66 by bolts 85 which also pass through gussets 86 and gussets 87 from the outside of drum D as also shown in Fig. 8. As the inner sleeve or shell 65 expands and contracts, its one end is free for relative movement in ring 82, its outer end being anchored to head 80 at the end of the drum D. The intermediate shell 66 is anchored at the outlet end of drum D by bolts 85 which connect it to gussets 84 and 86. It can expand and contract within a band 89 at the inlet end of drum D within which there is a slip ring 90 fixed to the end of the intermediate shell, the shell terminating in spaced relation to the semi-toroidal head 80 to leave clearance for the passage of material from the inside around to the outside of the intermediate shell.

Communication between the inner tube 65 and the space between that tube and the inner shell is provided at the outlet end of the drum, such communication taking place within an inner quarter toroidal drum head 92 having a central closure 93. The material passes from left to right, as viewed in Fig. 8, through the inner tube, thence back through the inner tube and the intermediate shell 66, thence from left to right between intermediate shell 66 and outer shell 67, finally being discharged between head element 92 and head element 94 and head closure 95 into the outlet pipe 96, the latter having an annular seal 97 engaged by head ring 98 and held by atmospheric pressure to the head ring while supported from pipe 96 the same as the seal 71 already described.

The dehydrating drum B is provided with a sprocket 98 driven by chain 99 from motor 100 (Fig. 1) for the rotation of the drum.

The outlet conduit 96 is connected by the frusto-conical throat 101 with the casing 102 of blower E. The outer wall of this casing is volute, leading to the tangential outlet 103 connected by pipe 104 to the cyclone F. A shaft 105 projects into the casing and carries a runner or rotor 106 with arms 107 which support blades 108 desirably tapering in both directions from their mid-points as best shown in Fig. 29. It will be observed that between the tapered margins 109 of the blades and the tapered throat 101 of the inlet pipe 96 there is clearance for the material to enter casing 102 without being impacted by the blades. The blades create a powerful vortex of the dehydrating gases and this vortex extends into the throat 101 and pipe 96 to an extent sufficient so that the solids are thrown out centrifugally to the periphery of throat 101 and remain at the periphery of casing 102 well outside the path of rotation of blade 108, being discharged tangentially through pipe 104 without ever being touched by the blades. The construction of fan G is similar but inasmuch as the two fans operate at different speeds, and require different power, each is provided with its own motor, the motors being shown in Fig. 1 at 110 and 111, respectively. The fan E desirably has a variable speed drive to provide for adjustment of the rate of flow of dehydrating gases through the dehydrating drum, subject to manual or automatic controls as hereinafter described.

The cyclones F and H are similar except in diameter, cyclone F having the larger capacity because of the enormous volume of dehydrating gases which it must handle. The two cyclones also represent different embodiments of back pressure control means, but in each case the cyclone is designed to provide a means for varying the discharge gases in accordance with variations in barometric pressure in order to free finely powdered material from the gases with maximum efficiency, the manner in which this is done being hereafter explained. The means of controlling flow of gas from the cyclones is interchangeable.

As shown in Figs. 36 and 37, the pipe 104 discharges tangentially into the cyclone F in a conventional manner to establish a separation vortex within the cyclone. The whirling mass of gas and solids moves helically downwardly through the cylindrical portion 113 of the cyclone into the tapered lower portion 114 thereof. At some point in the latter portion, the gases at the inside of the vortex will cease their downward movement and commence to move upwardly to escape through the gas outlet 115. If this outlet has a fixed volume, the precise point at which the upward movement of the gases will commence will depend upon the barometric pressure, and will vary as the barometric pressure changes. However, I have discovered that it can be controlled by varying the capacity of the outlet. This may be done, for example, by providing the outlet 115 with a series of shutters 116 having arms 117 connected by a link 118 and arranged to be operated through link 119 from an arm 120 on shaft 121 which projects from control box 122 within which there is barometrically controlled means for its operation.

The control device, being specific to this mechanism, and independent of the rest of the apparatus, will be here described (see Figures 38 and 52).

An evacuated bellows 125 externally exposed to atmospheric pressure and mounted on bracket 126 has its operating terminal 127 supported by a compression spring 128 within the bellows. The bellows will be caused to expand and contract in accordance with changes in the barometric pressure, the atmospheric pressure being exerted on the movable end of the bellows against spring 128.

The resulting expansion and contraction of the bellows very sensitively actuates lever 129 which is held to the pointed member 127 by a tension spring 130. The lever is pivoted upon, but free of connection with, a shaft 131 which carries worm gear 132. The engagement of pointed element 127 with lever 129 desirably occurs close to the fulcrum of the lever to achieve a proportionately increased movement of the remote end 133 of the lever.

Spaced at opposite side of the electrical contact carried at the end 133 of lever 129 are contacts 134 and 135, respectively, so that the slightest movement of the lever in either direction will engage one of the contacts 134 or 135 between which the lever is ordinarily centered as shown in Fig. 52. Contacts 134 and 135 are carried by an arm 136 mounted on the worm gear 132. The lever 133 is wired to one side of an electrical supply line and the other side is connected to the contacts 134 and 135, respectively, through relay coils 137 and 138. Thus, one or the other of such coils will be energized according to whether the lever 133 engages contact 134 or contact 135. The energization of either coil will close its respective relay switch 139 or 140 to energize the motor 141 in one direction or the other. The armature shaft 142 of the motor is coupled as shown in Fig. 38 through a reducer 143 to a worm 144 meshing with worm wheel 132. The armature shaft of the motor also mounts worm 145 meshing with worm wheel 146 on shaft 121 which controls the shutters.

The arrangement is such that if the barometric pressure increases, thus tending to depress the turning point of the gases within the cyclone separator, the resulting reduction in length of bellows 125 will cause lever 129 to oscillate clockwise as viewed in Fig. 38, thereby engaging its free end 133 with electrical contact 134 to complete a circuit as shown in Fig. 52 through relay 137 to close relay switch 139. This will energize motor 141 for rotation in a direction to open the shutters 116 from the intermediate position in which they are shown, thus reducing the back pressure within the cyclone just enough to compensate for the increased barometric pressure of the atmosphere. At the same time, the rotation of motor 141 to actuate the shutters will also oscillate the worm gear 132 and the arm 136 carried thereby in a direction to shift contact 134 out of engagement with the free end 133 of the contact lever 129, thus breaking the circuit to the motor. This arrangement is a very sensitive and effective manner of providing adequate power to shift the shutters in exact accordance with variations in barometric pressure. Continued change of barometric pressure will result in renewed movement of arm 129 and the motor driven mechanism will exactly follow the movement of that arm, the circuit to the motor being established whenever the lever 129 is displaced with respect to the arm and being broken whenever the arm re-centers itself with respect to the lever. The converse operation will occur when the barometric pressure falls, the shutters 116 being closed, in such a case to reestablish the desired pressure within the cyclone. The movement will always correspond in direction and extent to the change in barometric pressure. Consequently, the point at which the gases change direction within the cyclone will be kept at a constant level.

The level at which this direction change occurs is very important in order to achieve efficient separation and prompt discharge of all material regardless of weight, thereby avoiding holding the fines in the cyclone with resultant excessive dehydration and pulverization and oxidation.

In order to assure efficient separation, I have provided baffle flanges 150, 151, etc. within the tapered portion of the separator. Reference is made to Figs. 30 to 35. Although the separator there illustrated is separator H, the construction of the separators is the same except in size. The flanges 150, 151, etc. comprise discontinuous sections of a screw thread or threads so pitched with reference to the direction in which the material is whirling within the separator portion 114 that the engagement of the material with the flanges will feed the material axially of separator section 114 toward the outlet end 160 thereof. In order to accomplish this result, I have found it desirable that the thread sections should progressively increase in pitch as disclosed in my Patent 2,530,-112, issued Nov. 14, 1950. In the present device, however, I have also started each section at a slightly higher level within the separator cone 114 than the terminus of the next preceding section. Thus the discharge end of flange section 150 extends at least to the same level and desirably slightly below the beginning end of flange section 151. The latter extends to the same level or slightly below the beginning end of section 152. Thus, each succeeding section releases the material at a level sufficiently low to assure the engagement thereof by the successive section.

Instead of forming the feed screw sections as undercut shoulders in the manner disclosed in Patent 2,530,112, I have found it desirable for the purposes of the present device to weld the respective flanges to the inner surface of the conical portion 114 of the separator and then to provide a ceramic or other filling at 161 extending from the outer edge of the flange to the inner surface of the separator cone as best shown in Fig. 35. This filling is desirably perfectly smooth and it serves to eliminate any surface upon which the dehydrated material may lodge and build up.

The first of the flanges or discontinuous screw sections which acts upon the solid materials should be located substantially at the precise level at which the helically moving air in the vortex within the separator loses its downward axial component and starts moving upwardly through the center of the vortex. It is to locate this turning point accurately at the level of the first screw section that I provide the barometrically controlled outlet damper as described above in connection with separator F, or the alternative form shortly to be described in connection with separator H.

Despite the fact that the dehydrating gases have been cooled markedly within the separator drum, from a temperature of about 1400° F.–1800° F. to a temperature of about 200° F.–300° F., the material which has been dehydrated and which, by giving up its moisture, has effected this cooling, is still rather hot upon discharge from separator F. In order to reduce it as nearly as possible to atmospheric temperature, I desirably cool it by reentraining it in atmospheric air in chamber 161 (Fig. 1). This chamber has an inclined chute 162 in its bottom which communicates openly at 163 with the atmosphere. Any stones or other foreign matter will tend to fall through the opening 163 in opposition to the stream of atmospheric air drawn into such opening by the blower G. The dehydrated produce will readily be entrained in the current of air and will pass through blower G without contact with its veins, the construction being identical, except in dimensions, with blower E as already described as shown in Figs. 28 and 29.

Blower G discharges through cyclone inlet 164 tangentially into cyclone separator H. In the conical lower end of this separator H, the discontinuous feed screw sections already described urge the material downwardly to the discharge point 160, whence it flows selectively through pipes 165 or 166 into sacks or other receptacles. The air by which the material has been pneumatically conveyed and, at the same time cooled, is discharged from separator H through its upwardly opening discharge pipe 167, the capacity of which is regulated, to produce a controlled degree of back pressure by means of a vertically adjustable cap or damper 168 as shown in Figs. 30 to 33. Brackets 169 on the sides of the discharge pipe 167 provide bearings for screws 170 which are threaded in nuts 171 fixed to the damper 168. The screws carry sprockets 172 encircled by chain 173 so that all of the screws will operate in unison. The chain passes around a driving sprocket 174 on shaft 175 which projects from a control box 176 corresponding in function and operation to that shown in Fig. 38 and above described. Any change in barometric pressure will result in the rotation of shaft 175 to produce corresponding rotation of the several screws and to adjust the damper 168 in a direction to vary the back pressure upon the air leaving the outlet pipe 167 to an extent just sufficient to compensate for the change in barometric pressure, thereby keeping the turning point of the air or gas within the cyclone exactly at the level at which the first screw-thread section engages the solids, thereby holding the solids against entrainment in the upwardly turning air. As above stated, it is contemplated that any form of barometrically controlled damper may be used and those illustrated are regarded as interchangeably applicable to either cyclone, as exemplifications of some of the various possibilities.

For manual control, the shaft 175 may be declutched from the output shaft of control box 176 and actuated by the hand wheel 175' as shown in Figs. 32 and 33, it being understood that the dampers of Figs. 36 and 37 be manually rather than automatically actuated if desired.

For the operator's information and guidance in adjusting the machine for efficient operation, I may provide a humidistat instrument 123 having wet and dry bulb thermometers disposed at 124 in the path of gases leaving cyclone separator F after effecting dehydration. Their degree of saturation will indicate the efficiency with which they have been used.

The drum construction is desirably of the unique form now to be described. Thus far, the several shells of the dehydrating drum have been identified as an inner tube 65, an intermediate tube 66, an outer tube 67, but nothing has been said of the manner in which these tubes or shells are constructed. In the past, each of the tubes or shells has been made like a boiler and has subsequently had the flights riveted, or sometimes welded, thereto. The entire drum has been assembled in a boilerworks and has had to be shipped as a unit to the place of use. Such shipment is costly and, in many instances, prohibitively expensive. Accordingly, I have devised a drum construction which is novel both structurally and in terms of method and which permits segments of the various shells to be prefabricated, frequently with flight sections integral therewith. These sections are designed so they can be shipped approximately flat and to some degree nested. Since much of the welding can be done in the open, in contrast to the extensive work heretofore required in the interior of the drum, I not only effect great savings in shipping costs, but actually simplify the drum construction to such an extent that assembly at the point of use is easier than the building of the drum in a factory or boilerworks in accordance with previous practice.

Figs. 11 to 14 show a preferred embodiment. The inner tube or shell 65 may be made of only two units connected together in alternation throughout the entire periphery of the shell. These are shown in Fig. 12. The unit 177 has an intermediate portion which comprises a segment of the shell and from which a flight portion 178 projects outwardly. The intermediate portion has an offset at 179 forming a shoulder at 180. On the offset is integrally formed the inwardly projecting flight 181. It will be noted that the flight sections 178 and 181 are not radial but are inclined oppositely to each other, flight 178 projecting radially and to the left as viewed in Fig. 12, whereas flight 181 projects radially and to the right.

Alternating with the drum segment thus described is drum segment 182. From its lefthand margin as viewed in Fig. 12, flight 183 projects radially and to the right to form an acute angle at 184 which is received against shoulder 180 so that the offset shell segment 179 laps shell segment 182 when these parts are assembled as shown in Fig. 11. Near its other margin, shell segment 182 is similarly provided with an offset at 185 forming a shoulder 186 against which the angle 187 of the first described unit engages. Flight 188 is integral with offset segment 185 and projects radially outwardly and to the left as viewed in Fig. 12. When the parts are assembled, the flights 178 and 183 will be divergent, whereas the flights 181 and 188 will be convergent. Intermediate flights 182 may be added if desired to project both inwardly and outwardly from the resulting drum, as shown in Fig. 11. These are omitted in the disclosure of Fig. 12, their use being optional. If these flights are used, they may be attached to individual units or mounted as the units are assembled into the drum whether at the factory, assembly plant, or in the course of assembly at the final installation. However, when attached, they will preclude the full nesting of the units. It will be apparent that each of the two units in the form shown in Fig. 12 can be substantially completely nested with respectively similar units for convenience of shipment. Accordingly it may be preferred to ship the units in the form shown in Fig. 12 and attach the flights in the course of assembly at the point of use. The mode of assembly will be hereinafter described.

Fig. 13 shows three units used to make up the intermediate shell. The first of these, as illustrated in Fig. 13, comprises a shell segment 189 which has outwardly divergent flights 190 and 191 integral with it. The second unit of the intermediate shell as shown in Fig. 13 comprises a shell segment 192 having spaced shoulders 193 and 194 which offset the shell segments 195 and 196, respectively. From the offset shell segments project the inwardly divergent flights 198 and 199. The angle 200 between the shell segment 189 and the flight 191 of the first unit fits into the shoulder 193. Shoulder 194 is abutted by the margin 201 of a third unit which comprises shell segment 202. This shell segment has no flights but is shouldered at 203 to provide an offset 204. The angle 205 of the first unit seats against shoulder 203 of a proceeding unit of the third type. These units are repeated in the sequence described throughout the entire intermediate drum 66. As above described, I may optionally provide short intermediate flights 202. In the intermediate drum 66, these will ordinarily be mounted upon drum segment 202. If these intermediate flights are omitted, at least in the initial fabrication of the drum segments and integral flights, it will be evident that the three units as above described may each be nested with other units of the same kind for convenience of shipment.

The outer shell 67 requires only two units for its construction as shown in Fig. 14. The first unit is very similar to the second unit shown in Fig. 13. It comprises a drum segment 207 shouldered at 208 and 209 to provide offset portions 210 and 211. Integral with the offset portions are the inwardly divergent flights 212 and 213, respectively, no outwardly divergent flights being required in the outer shell. Lapping the offset portions 210 and 211 are drum segments 214 which have no flights except the optionally usable intermediate flight units 215 which, as shown in Fig. 11, may comprise shallow channels, the side flanges of which are mutually divergent to constitute flights.

At the ends of the respective segments, wherever they must fit within ring portions of the respective heads or gussets, the flights are terminated as shown in Figs. 8 and 10.

Fig. 10 shows a fragment of the intermediate shell 66. The flights 198 and 199 of shell segments 192 extend to the ends of such segments, since these do not interfere with the mounting of the shell. However, the flights 190 and 191 of shell segments 189 terminate short of the ends of such segments to permit application of the ring 90 as shown in Fig. 8. As will be observed in Fig. 8, flights 212 and 213 of the outer shell segments 207 are also cut short to avoid interference with gussets 800 and the external flights 178 and 183 of the inner tube or shell 65 are sufficiently shorter than segments 177 and 182 of such shell to avoid contact with gussets 801 and the semi-toroidal head element 80, the latter desirably being made in two parts as shown, and more particularly described, in my Patent No. 2,618,865, granted November 25, 1952.

Figs. 15 to 19 disclose a modified embodiment in which the lifting action of the flights is supplemented by convolutions formed in the shell segments themselves to extend longitudinally of the segments and the resulting shells. The inner shell 216 in this construction is made of four types of segments as best shown in Fig. 16. Each of these is reversely curved in cross section. There is one segment 217 longitudinally shouldered at 218 and at 219 and provided with an inwardly projecting flight at 220. The next segment 221 has a margin at 222 which seats against shoulder 218. It has an outwardly projecting flight at 223. The third section 224 has a marginal portion 225 which laps the second section and is offset to provide a shoulder at 226 engaged by the angle 227 of the second section at the base of flight 223. The third section has another shoulder at 228, beyond which it has an inwardly projecting flight 229. The fourth section 230 has a margin 231 which seats against the shoulder 228. At its other margin, it is provided with an angle 23 beyond which it has an outwardly projecting flight 33. The shoulder 219 of the first type of section 217 receives the angle 232 as shown in Fig. 15.

The assembly of these four segments in repeated consecutive series makes up a longitudinally fluted shell 216. Alternate channels on each face of the shell lie between convergent and divergent flights respectively.

The same result is achieved in the intermediate shell 236 through the use of the separate segments shown in Fig. 17. Each of these is also divergently curved in cross section. The first section 237 is shouldered at 238. Along one margin, it has an acute angle 239 beyond which projects the flights 240. At its opposite margin, it carries the inwardly projecting flight 241.

The second element 242 carries no flights. Its margin 243 seats against shoulder 238. Near its opposite margin it has a shoulder 244.

The third type of segment is shown at 245. It is obtusely angled at 246 to provide flight 247. Near its other side, it has an offset which provides a shoulder at 248 beyond which it carries flight 249. The fourth segment 250 has a margin 251 which seats against shoulder 248, and near its other end it has a shoulder 252 abutted by angle 239 of the first section, the sequence now being repeated. The outer shell may be identical with that shown in Fig. 14, without convolutions.

Inasmuch as the inner and intermediate shells have to be interengaged with angular parts of the drum heads, adapters 253, 254 and 255 are used, the adapter shown in Fig. 18 being typical, and all of the adapters being shown in section in Fig. 19. Each adapter is annular and has at one end a cylindrical portion 256, the other end being fluted at 257 to fit the fluted sectors of the respective shells.

Figs. 20 to 23 disclose various other sectional shell constructions and demonstrate the fact that rivets or other securing devices may be used in lieu of welding to assemble these sections. Fig. 20 shows a construction using two types of segments in riveted connection. The segment 258 is shouldered at 259. At 260 it is acutely angled to provide flight 261. At 262 it is acutely angled to provide flight 263.

The segment 264 is obtusely angled at 265 to abut shoulder 259. Beyond the angle 265, this shell segment carries flight 266. Near its other side, flight segment 264 is shouldered at 267 and beyond the shoulder it is obtusely angled to provide flight 268. The shoulder 267 is abutted by the angle 260 of a segment of the first type shown at 258, the sequence being repeated. Rivets 269 connect lapping portions of the segments to hold them together. This view further illustrates the fact that the free margins of any of the flights may be reenforced by reversely folding them or beading them as shown at 270.

In Fig. 21, the inner and outer flights are integral with each other, the shell segments being initially free of flights. Shell segments 272 and 273 alternate. They may have oppositely directed flanges 274 and 275 at their respective sides. The flight elements 276 intervene between, and are connected with, flanges 274 and 275 of consecutive segments 272 and 273 and are alternately turned in opposite directions. Each is a concave channel so that the resulting flights 277 and 278 diverge at both sides of the shell.

The construction shown in Fig. 22 is one in which the bottom web 279 of a channel-shaped segment is shouldered at 280 and 281, its margins being flanged outwardly to provide flights 282 and 283. Alternating shell segments 284 have their lateral margins engaged with shoulders 280 and 281, rivets 269 being used at points of overlap.

In the construction shown in Fig. 23, a concave shell segment 285 has its margins reversely folded at 286 and 287 to be hooked together and pressed flat to effect joints between consecutive segments. Each segment will carry flights 288 and 289 which may be riveted or welded thereto.

A means of assembling a dehydrator drum from the various disclosed segments will now be described.

The respective drum heads are preferably preassembled at the factory and may be almost identical in construction with the drum heads in my Patent No. 2,618,865. The principal difference between the drum heads here shown and those of my Patent 2,618,865 consist in the fact that the large bolts which hold the heads together are screwed into a nut in the back edge of the gusset 84 (Fig. 24) instead of into a tapped bore of gusset 84 as in said patent. This construction is preferred; otherwise the drum heads of the said copending patent may be used.

With the drum heads assembled, and desirably even mounted on their respective rollers 77, 78 and temporarily supported from above by the hoist members 459 from a temporary overhead track 460, temporary tie bars 461 are clamped to the respective heads to hold them in properly spaced relationship pending application of the shell segments. In assembling the heads, temporary spacers are used at 462 and 463 (see Figs. 24 and 27). The spacer 462 fills the space ultimately to be occupied by segments of the intermediate shell between the gusset 84 and the gusset 86 and the ring 464 within the latter. The spacer abuts the inner margin of the inner drum head 92.

Spacer 463 lies between gusset 86 and the ring 465 and is in the plane of the inner margin of the outer drum head 94.

With the drum heads thus mounted, it is only necessary to connect the several shell segments to each other and to the drum heads by riveting or welding or bolting until the drum is complete. Fig. 24 shows the assembly commencing with segments of the inner shell. These are being welded not only to each other as above described, but to the ring 466 of the head at the left and ring 81 of the head at the right. Upon completion of the inner shell, the segments of the intermediate shell will be welded successively to each other and to the ring 90 of the head at the left and the ring 464 of the head at the right and also to the inner head 92. Thereupon the segments of the outer shell will be similarly welded in place. As the work progresses to the points where the spacers 462 or 463 are located, the spacers will be removed, bolts 85 being temporarily withdrawn singly for the purpose, the segments will be manipulated into place and the bolts restored.

The device as herein disclosed desirably includes a perfected system of automatic controls. These lower the cost of operation, increase the efficiency and insure the production of a more perfect and uniformly dried product by positive and automatic control of (a) the input of material into the drier; (b) the supply of fuel and combustion air to the burners; (c) the temperature of the pneumatic current of dehydrating gas; (d) the volume and velocity of the current of dehydrating gas, and consequently the time for which material to be dehydrated will be exposed to the gases within the drum; and (e) the point at which separation is achieved in the cyclones, thereby compensating for changes in barometric pressure. The various controls by which regulation is automatically achieved are operated thermostatically, humidistatically, barometrically and in accordance with the moisture content of the incoming product. Some of these controls have already been described, but the effect thereof and their cooperative action will here be correlated with the remainder of the controls.

In my Patent 1,988,677 of January 22, 1935, I described means whereby a thermostat exposed to the gases leaving a dehydrator drum could be made to regulate the speed of an input conveyor generally corresponding to that here illustrated at B, as well as the rotary charger for delivering the material from some such conveyor into the flue leading to the drum. The present device uses a thermostat at 290 in the outlet pipe 96 from dehydrating drum D to control the rate at which the motor 291 drives through chain 292 (Fig. 42 and Fig. 49), the rotary charger at 33 and the sprocket 30 of the infeed conveyor 15. While automatic regulation of the infeed conveyor and charger was described in the patent above identified, it never went into general use for lack of ancillary controlled devices, such as those hereinafter described, and including means for rendering substantially uniform the amount of material carried by conveyor 15 at various points along its length.

As has already been explained, it is very desirable to be able to hold the dehydrated material with accuracy to any predetermined moisture content. If the material is excessively dehydrated, it is not only of inferior quality but it has consumed an excessive amount of heat and power in dehydration. However, if it is unduly moist, the material will spoil. Therefore, in devices in which the moisture content at the output could not be maintained with accuracy, it has been necessary to dehydrate the material excessively so that no portion thereof would remain sufficiently moist to spoil it.

In the device of my former patent, it was found inadequate to merely accelerate or decelerate the rate of operation of the infeed conveyor in accordance with the rise or fall of temperature at the dehydrator outlet. If the rise was excessive, an immediate introduction of additional material was required in order that evaporation of the moisture therefrom might lower the dehydrator temperature; otherwise the material in the dehydrating drum might catch fire or at least become scorched. Unless the amount of material at all points along the infeed conveyor could be maintained substantially constant, the amount of material supplied in response to an increase in the rate of conveyor operation would not bear any predetermined relation to the outlet temperatures of the gases used in dehydration. There might be a demand for an increase in the amount of material but if the input conveyor was underloaded, a mere acceleration of the conveyor would not supply the required material.

Accordingly, the present device combines with thermostatically regulated conveyor speed control a further control for assuring the maintenance of a substantially uniform layer of material on the infeed conveyor.

The pivotally mounted frame 25, counterbalanced by weight 27 on arm 26 as shown in Figs. 2, 3 and 4, and above described, has its driving shaft 23 connected with motor 295 for the actuation of levelling conveyor 18, or the alternatively usable rotors 21', 22' in the direction indicated by the arrows in Figs. 2 and 2A. The conveyor flights 19 in Fig. 2 and the fingers with which the rotors 21', 22' are provided in Fig. 2A serve to pull rearwardly on the elevator 15 all material in excess of the predetermined depth shown beyond the levelling devices in Fig. 2.

Any excess of material building up at 28 beneath the free floating end of the levelling frame 25 oscillates the levelling frame clockwise as the material acculmulates. Any such oscillation is used to reduce the rate at which material arrives at this point. For this purpose, motion of the levelling frame is communicated through link 296 (Fig. 3) to a control lever 297 which operates the control valve 298 to admit a lesser or greater amount of compressed air from pipe 299 to pipe 300.

Pipe 300 leads to a pressure operated speed regulator 301 (Fig. 6). The speed regulator 301 adjusts the variable speed driving mechanism indicated at 302 and through which the motor 303 drives chain 304 which actuates shaft 305 carrying the driving sprocket 306 for the loading conveyor 4. Thus, if the supply of material accumulating at 28 behind the levelling conveyor 18 decreases, conveyor 4 will be accelerated. If the reserve material increases, conveyor 4 will be decelerated. Since the supply of material on conveyor 4 is by no means uniform, the mass accumulated at 28 beneath the floating end of conveyor frame 25 serves as a reserve from which the level on the infeed conveyor 29 is equalized.

The conveyors 7 and 9 are driven at a rate which may be constant by motor 307 through sprocket 308, chain 309 and the driven sprocket 310 and 311 on the drive shaft 8 for conveyor 9 and the drive shaft 312 for conveyor 7. Because of the equalizing effect above described, it is not necessary to have the conveyors 7 and 9 partake of the speed variation employed in driving conveyor 4.

An alternative feeding arrangement is shown in Figs. 55, 56 and 57 of Sheet 15. The conveyor 15 traverses table 13 in feed trough 12 substantially the same as in the previously described embodiments. The levelling devices of Figs. 2 or 2A may be used, that of Fig. 2A being illustrated. As the lever 25 oscillates in response to accumulations of material (or the lack thereof) beneath rotor 22' at its floating end, pressure from the supply line 299 is communicated at a greater or lesser value to the pipe 300 which, in this instance, leads to a control 365 on a speed changer 366 driven by motor 367 to operate a flexible shaft 368 detachably connected with the shaft 369 which serves as a windlass upon which ropes 370 are wound to propel the follower 371 of a self-unloading vehicle which is merely diagrammatically illustrated at 372, it being understood that any self-unloading vehicle may be used at this point. In order that delivery from the vehicle may be rendered uniformly responsive to the rate of advance of the follower 371, the vehicle is desirably provided with a conveyor 373 extending upwardly and inwardly from the rear end of the vehicle, the upper end of such conveyor desirably being adjustably floated as best shown in Fig. 56. A spring 374 exerts a forward bias on the upper end of the pivoted carrier 375 upon which the conveyor sprockets 376 and 377 are mounted. A rope 378 fastened over pulley 379 to a windlass at 380 permits the operator to draw the upper end of carrier 375 toward the vertical position in which it is illustrated in Fig. 57, and in which position the conveyor functions substantially as a tail gate for the vehicle. When lowered to the approximate position shown in Fig. 56, and set in motion by supplying current to motor 382, this conveyor tends to effect the regulated discharge of the material by ejecting it uniformly as it arrives, so that the delivery of the material into the trough will, in actual practice, depend upon the rate at which the follower 371 moves toward the rear end of the vehicle under the control of the floating lever 25 as above described. In this embodiment, as in the previously described device, the objective is to accomplish uniformity of flow of the infeed conveyor B leading to the dehydrator.

Means is provided for utilizing variations of temperatures at the outlet of the dehydrator to effect adjustments whereby material traversing the apparatus can be dehydrated to a predetermined moisture content.

As best shown in Fig. 49, an adjustment is provided by knob 315 for the control valve 316 operated by thermostat 290 in the drum outlet pipe 96. This regulating knob at 315 permits the valve to be adjusted to respond to a given extent at different temperatures to which the thermostat 290 is subject, thereby enabling the moisture content of the material discharged from the dehydrator to be maintained at different predetermined values. Valve 316 is located in the air pressure line 317 to control the rate changing pneumatic motor 318 as described in my former patent.

The fluid pressure transmitted by such valve, as controlled by the thermostat (modified by the setting of knob 315) is also admitted to similar pneumatic motors at 319 and 320 which regulate the fuel supply (here represented by burner 44) and the air admission dampers 50 which admit the air to the combustion chamber to cushion the walls thereof from the heat of the flange, such air being mixed with the products of combustion to comprise the dehydrating gas used in the drum. Pneumatic motor 319 operates the dampers 64 which admit auxiliary air to the inlet 62 which leads into flue 36 between the combustion chamber and the drum.

The damper motor 320 is connected to rock shaft 54 which directly effects the regulation of the burners 44. The dampers 48 and 50, all operating in unison also receive motion from rock shaft 54, through arm 55 which has a pin 55' at its free end moving in a slot in link 56. The damper rock shaft 51 has attached thereto an arm 56' to which is pivoted the link 56. The burners respond directly to automatic regulation by motor 320 while the lost motion provided by the slotted link 56 permits damper response to lag for effecting control subsequent to burner response.

The controls already described are calculated to maintain the inflow of material and the inflow of dehydrating gases at substantially predetermined relative values. However, for complete accuracy, further adjustments must be made according to the initial moisture content of the material to be dehydrated and the humidity of the ambient air admitted to the furnace.

If the water content of the ambient air, as determined by the humidistat diagrammatically illustrated in Fig. 49, is relatively high, the dampers 52 should be controlled in their movement so that they will not operate through the same range as if the moisture content were average. In the device shown in Fig. 49, a wet bulb thermostat 325 and a dry bulb thermometer 326 respectively communicate with bellows 327 and 328, the expansion of which is by the arrangement shown. Bellows 327 acts on one end portion 329 of a bell crank 340, the fulcrum 341 of which is mounted on bellows 328. The free end 342 of the bell crank is connected by link 343 with a floating lever 344, the link being subject to the bias of tension spring 345. The lever 344 carries a double contact at 350 which, according to the direction of lever oscillation, engages contacts 351 or 352, these being carried on the arm 353 of a worm wheel 354 coaxial with the fulcrum of lever 344. If relatively humidity increases, the differential between the wet and dry bulbs will be reduced, lever 340 will oscillate counterclockwise and a circuit to contact 352 will be closed. If humidity decreases, lever 340 will oscillate clockwise and the circuit to contact 351 will be closed.

The contacts 351 and 352 are connected to a motor 355 to operate the motor in forward or reverse direction, thereby driving the shaft 356 on which a worm 357 meshes with worm wheel 354. At its other end, the shaft 356 carries a cam 358 in the path of a rocker arm 359 carried by damper shaft 35'. Thus, according to the humidity of the ambient air, the cam 358 regulates the opening of the dampers 52 to maintain them open more widely when humidity is low than would be the case if the humidity were high. This, in turn, regulates volume of flow of dehydrating gas so that under high humidity conditions higher temperatures of dehydrating gases at the drum inlet and reduction in rate of flow compensate for the slower dehydration under such conditions.

It will be observed in Fig. 49 that the cam 358 is mounted to be axially slidable upon shaft 356 subject to the bias of compression spring 361 which urges the clutch jaw 362 on the hub of the cam into engagement with the complementary clutch jaw 363 carried by shaft 356. This arrangement permits manual operation of the cam independently of the control mechanism to any desired position, such adjustment being primarily intended for calibrating the apparatus to assure that the damper position as fixed by the cam will reflect accurately the humidity conditions to which the control mechanism responds. It may be noted in passing that similar provision for calibrating adjustment is made in all of the automatic controls. It will be observed, for instance, in Fig. 31 that the coupling sleeve 364 is slidable along shaft 175 against the bias of spring 365 for disengagement from the splined end 366 of the control shaft 367 which projects from the control box 176.

Where any special situation requires in different apparatus, the electrical connections to the reversible motor 355 (Fig. 49) may be interchanged, it being my purpose to claim broadly the feature of humidity-control of air admission dampers in a dehydrating system.

In order to render the operation completely automatic, it is desirable to take account of the wetness of the material to be dehydrated, as well as the humidity of the air used in the dehydrating gases. To this end, I have devised means responsive to the electrical conductivity of the incoming material, such conductivity being proportional to its moisture content, to adjust the apparatus to compensate for variations in such content. Referring to Fig. 53 (Sheet 7), I have provided near the delivery end of infeed conveyor run 15 a pair of electrodes 390, 391. Electrode 390 is supported by insulation 392 in the bottom of the conveyor trough, while electrode 391 is supported by insulation 393 upon a lever 394 mounted for pivotal movement on a rock shaft 395 which carries, externally of the conveyor trough a rocker arm 396 biased downwardly by a weight 397 whereby material moving upwardly with conveyor run 16 is subjected to pressure between electrodes 390 and 391.

An upwardly projecting arm 398 on rock shaft 395 is engageable with a stop 399 to define a lowermost position of lever 394 which precludes direct contact of electrode 391 with electrode 390 when there is no material interposed between the electrodes. Short of such lowermost position, the finger 400 on arm 398 opens a normally closed switch 401 in the circuit to motor 402. Such circuit may also be opened by another normally closed switch 403 in series in such circuit with switch 401. Switch 403 is actuated by a governor-controlled arm 404 to open the circuit when the motion of conveyor sprocket 405 ceases. The shaft 406 of governor 407 is geared to sprocket 405 so that in the event of shutdown of the conveyor, the circuit to motor 402 is opened.

Assuming that the conveyor is in operation and material to be dehydrated is present between the electrodes 390 and 391, any increase or decrease in the current flowing through the electrodes operates motor 402 in one direction or the other as will now be described.

Connected in series with the electrodes and with a line 409 is a sensitive volt meter 410 having a pointer 411 carrying electrical contacts 412 at its end. Worm wheel 413 mounted substantially coaxially with the meter pointer 411 carries an arm 414 having spaced contacts 415 and 416 between which the contact 412 of the meter pointer is normally centered. If the meter pointer closes the circuit to either of the contacts 415 or 416, the motor 402 is energized and drives worm 418 to actuate the gear wheel 413 in a direction to re-center contact 412 between contacts 415 and 416, thereby breaking the motor circuit.

The same motor operation which re-centers the contact, actuates another worm at 419 engaged with worm wheel 420 which is connected with the adjusting element 315' of thermostat 290. It will be remembered that in the construction previously described the thermostatic adjustment was made by manually operated knob at 315'. The present arrangement mechanically actuates the control 315' to permit fluid pressure to flow through the valve 316 in greater or less degree with the same result as if the knob 315 had been manually operated to meet the exact requirements caused by increase or decrease in moisture content of the supplied material. The fluid supply line 317 is connected through valve 316 as shown in Fig. 49 to control the various motors 318, 319, 320, for adjusting the dampers, accelerating or decelerating the infeed conveyor run 15, and controlling fuel flow to the burners through valve 425. In the oil supply line 424 to the burner is a solenoid-opened spring-closed valve 425 (Fig. 49), held open electromagnetically when the burner is operating properly. A normally closed switch 426 in an electric circuit including supply line and the solenoid, holds the valve open. When the dampers 52 close to their extreme position, rocker arm 427 on rock shaft 360, engages and opens switch 426 to close the valve 425 in oil line to shut down the burners. Consequently, if the current fails or the control capacity of the apparatus is exceeded in a direction calling for heat, the burner will be shut off to avoid destruction of the furnace.

In manual operation, if the arriving material supplied by the infeed conveyor increases in moisture, the operator normally re-sets the thermostat to allow for increased output temperature at the delivery end of the dehydrator. This readjustment of the thermostat results in the increased supply of fuel and combustion air to the burners. The automatic adjustment of the thermostat through the arrangement shown in Fig. 7 accomplishes the same result but includes safety controls to preclude overheating in the event that the infeed conveyor stops or material ceases to be supplied thereon, or in the event that the furnace tends to overheat.

In manual operation, if the material supplied for dehydration is less moist, the operator reduces the amount of heat or feeds more material. The automatic controls above described do the same thing mechanically.

Fig. 54 shows an alternatively or simultaneously usable arrangement in which I may change the speed of the exhaust fan E to increase the vacuum and accelerate air flow through the dehydrator when the material is wet and heavy, the air flow being correspondingly reduced in speed when the material is dry and relatively light. To this end, the electrodes 390 and 391 are connected to a control device at 430 which is comparable to the control device shown in detail in Fig. 53. The output shaft 431 corresponds to the shaft upon which worm wheel 420 is mounted in Fig. 53 and it is connected by link 432 with a variable pressure reducing valve 433 which controls transmission to line 434 of fluid pressure to a damper motor 435 similar to the pressure-operated motors already described. The motor 435 is connected to a speed changer 436 interposed between the fan motor 110 and the exhaust fan E to vary the rate of operation thereof in the manner already set forth.

An increase in current flow between electrodes 390 and 391 will reflect increased wetness of the material. This is cared for mechanically and automatically through the disclosed apparatus by increasing fuel consumption and increasing the speed of operation of the fan.

While it is not essential to the invention, I prefer to provide means whereby the operator can check upon the functioning of the entire system by consulting the instruments on one conveniently located control panel 450. Fig. 1 diagrammatically illustrates this panel disposed adjacent the furnace C (Fig. 1). By way of example, I have shown grouped on the panel 450 a thermometer at 451 which shows temperatures at the outlet from the dehydrator drum D, a pyrometer at 452 which shows temperatures of the dehydrating gases at the point at which these leave the furnace C, a humidistat dial at 453 which gives readings of relative humidity, a manometer at 454 connected to the interior of the drum to show the degree of vacuum maintained therein by the exhaust fan E, a barometer at 455 which shows atmospheric pressures, and a pressurestat 456 connected to the operating line to show the air pressures therein available for operating the various controls as above described.

In recognition of the importance of continuous uniform dehydration to assure adequate drying of the material while at the same time protecting against fuel wastage, scorching and under-drying while, at the same time, making it unnecessary to employ the constant attention of skilled operators to anticipate the various requirements for these purposes, I have provided a device which affords a continuous even flow of material to be dehydrated and has controls which are self-adjusting in accordance with changes in the moisture content of the material, changes in the moisture content of the air, and changes in the barometric pressure of the air, the latter being important to avoid waste of material otherwise lost at the point of separation.

A major source of difficulty in connection with the operation of previously known dehydrators has involved the shutting down of the apparatus and unloading the drum without injury to the material being dried, without overheating the drum, and without either wasting heat or injuring the furnace.

The present device provides controls such that when the feeding of material is stopped, whether at the conclusion of a given period of operation, or because of lack of material supply or because of mechanical failure, the drum will automatically be completely unloaded without injury to the material or equipment. Stoppage of material flow results in a rise in outlet temperature and will automatically reduce the fuel supply in proportion to any tendency of rise of temperature within the drum; similarly the air required for combustion is reduced, this being controlled with the fuel. The by-pass dampers on the furnace flue leading to the dehydrator drum will automatically open; the dampers controlling the admission of auxiliary air will close (if these remained open, they would cool the furnace too rapidly); and finally, if the condition persists, the air and fuel supplied to the burners will ultimately be completely shut off. The by-pass dampers will remain open to admit atmospheric air into the dehydrating drum until the current is cut off, whereupon they are automatically self-closing. The result of these several operations is to maintain within the drum the temperatures appropriate for dehydration of such material as is passing therethrough until such material is completely discharged, at which time, the lack of evaporation within the drum will create outlet temperatures such as to shut down the furnace as above described. It will be observed that this is accomplished with full protection to the furnace, as well as the material in the drum. At the same time, the exclusion of atmospheric air from the furnace during shutdown leaves the interior of the furnace hot to facilitate immediate results of dehydration in the event that the shutdown was inadvertent.

I claim:

1. A dehydrating drum of the type comprising a generally cylindrical wall mounted for rotation and provided with peripherally spaced material-elevating flights, said drum wall comprising many drum segments connected upon lines longitudinally of the drum and having single thickness portions between said lines of connection to constitute the wall of said drum, a number of which segments each comprise integrally a portion of the wall and at least one of said flights.

2. The device of claim 1 in which said segments are channel-shaped, the wall portion comprising the bottom web of the channel, and spaced flanges of the channel constituting the said flights.

3. The device of claim 1 in which the said segments have flight flanges respectively projecting inwardly and outwardly from the margins of their respective wall portions.

4. The device of claim 1 in which the said segments have flanges providing the respective flights, the flanges of certain segments projecting inwardly and the flanges of other segments projecting outwardly from the respective wall portions forming parts of such segments.

5. The device of claim 1 in which wall portions of successive segments are curved in cross section and connected to provide a wall having longitudinal convolutions supplementing the flights projecting from said curved wall portions as a means of lifting material.

6. A dehydrating drum having longitudinal convolutions alternately convex inwardly and outwardly and flights connected with said convolutions to project alternately inwardly and outwardly from convex portions thereof.

7. A method of dehydrating drum fabrication which comprises fabricating drum segments including wall portions and flight portions, each such segment comprising a narrow sector extending lengthwise of the drum, and thereafter securing respective segments together longitudinally of the drum to constitute the sole wall thereof while supporting said segments in tubular series.

8. A method of fabrication of a drum having inwardly and outwardly projecting flights spaced circumferentially of its inner and outer peripheries, said method comprising the pre-fabrication of a plurality of drum wall segments, integrally providing certain segments thereof with inwardly projecting flights, supporting said segments temporarily in tubular series, and connecting margins of said segments longitudinally of the drum with contiguous margins of adjacent segments, the connections aforesaid being substantially the sole means required to constitute said segments the wall of the drum.

9. A method of fabrication of a drum having inwardly and outwardly projecting flights spaced circumferentially of its inner and outer peripheries, said method comprising the pre-fabrication of a plurality of drum wall segments, integrally providing certain segments thereof with outwardly projecting flights, supporting said segments temporarily in tubular series, and connecting margins of said segments longitudinally of the drum with contiguous margins of adjacent segments, the connections aforesaid being substantially the sole means required to constitute said segments the wall of the drum.

10. The method recited in claim 8 including the step of connecting between said certain segments other segments having no flights.

References Cited in the file of this patent

UNITED STATES PATENTS

| Number | Name | Date |
|---|---|---|
| 186,073 | Beauperland | Jan. 9, 1877 |
| 290,771 | Hemingray | Dec. 25, 1883 |
| 710,603 | Osborne et al. | Oct. 7, 1902 |
| 798,437 | Morse | Aug. 29, 1905 |
| 1,422,039 | Dean | July 4, 1922 |
| 1,501,566 | Lundberg | July 15, 1924 |
| 1,580,658 | Field | Apr. 13, 1926 |
| 1,972,516 | Fulmer | Sept. 4, 1934 |
| 1,988,677 | Arnold | Jan. 22, 1935 |
| 1,988,678 | Arnold | Jan. 22, 1935 |
| 2,076,873 | Arnold | Apr. 13, 1937 |
| 2,113,047 | French | Apr. 25, 1938 |
| 2,121,670 | Saives | June 21, 1938 |
| 2,222,930 | Arnold | Nov. 26, 1940 |
| 2,225,397 | Franks | Dec. 17, 1940 |
| 2,275,600 | Arnold | Mar. 10, 1942 |
| 2,285,718 | Isaacson | June 9, 1942 |
| 2,311,673 | Lilja | Feb. 23, 1943 |
| 2,341,101 | Howard | Feb. 8, 1944 |
| 2,442,148 | Rose | May 25, 1948 |
| 2,461,754 | Mertz | Feb. 15, 1949 |
| 2,508,792 | Ludwig, Sr. | May 23, 1950 |
| 2,510,536 | Williams | June 6, 1950 |
| 2,525,535 | Erisman et al. | Oct. 10, 1950 |
| 2,530,112 | Arnold | Nov. 14, 1950 |
| 2,602,594 | Heese | July 8, 1952 |
| 2,618,865 | Arnold | Nov. 25, 1952 |
| 2,624,447 | Small | Jan. 6, 1953 |
| 2,633,390 | Bush | Mar. 31, 1953 |
| 2,638,687 | Vincent | May 19, 1953 |